United States Patent
Testardi et al.

(10) Patent No.: US 9,372,809 B2
(45) Date of Patent: Jun. 21, 2016

(54) SYSTEM AND METHOD FOR STORING DATA OFF SITE

(75) Inventors: Richard Testardi, Boulder, CO (US); Maurilio Cometto, Boulder, CO (US); Kuriakose George Kulangare, Bangalore (IN)

(73) Assignee: STORSIMPLE, INC., Santa Clara, CA (US)

( * ) Notice: Subject to any disclaimer, the term of this patent is extended or adjusted under 35 U.S.C. 154(b) by 711 days.

(21) Appl. No.: 12/930,502

(22) Filed: Jan. 6, 2011

(65) Prior Publication Data

US 2012/0173822 A1 Jul. 5, 2012

Related U.S. Application Data

(60) Provisional application No. 61/335,653, filed on Jan. 6, 2010.

(51) Int. Cl.
| | |
|---|---|
| *G06F 12/12* | (2006.01) |
| *G06F 11/14* | (2006.01) |
| *G06F 12/08* | (2016.01) |
| *G06F 3/06* | (2006.01) |

(52) U.S. Cl.
CPC .............. *G06F 12/122* (2013.01); *G06F 3/065* (2013.01); *G06F 3/067* (2013.01); *G06F 3/0608* (2013.01); *G06F 3/0641* (2013.01); *G06F 11/1448* (2013.01); *G06F 11/1453* (2013.01); *G06F 11/1456* (2013.01); *G06F 11/1464* (2013.01); *G06F 12/0808* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 6,671,780 B1 | 12/2003 | Lu et al. | |
| 7,293,133 B1 | 11/2007 | Colgrove et al. | |
| 7,567,188 B1* | 7/2009 | Anglin et al. | 341/63 |
| 7,752,294 B2* | 7/2010 | Meyer et al. | 709/223 |
| 7,831,793 B2* | 11/2010 | Chakravarty et al. | 711/165 |
| 8,001,352 B1 | 8/2011 | Chatterjee et al. | |
| 8,046,331 B1* | 10/2011 | Sanghavi et al. | 707/640 |
| 8,443,157 B1 | 5/2013 | Reiner | |
| 8,677,052 B2* | 3/2014 | Patterson | 711/101 |
| 2004/0153606 A1* | 8/2004 | Schott | 711/114 |
| 2005/0097126 A1* | 5/2005 | Cabrera et al. | 707/102 |
| 2005/0125557 A1 | 6/2005 | Vasudevan et al. | |
| 2005/0203864 A1* | 9/2005 | Schmidt et al. | 707/1 |
| 2006/0010169 A1* | 1/2006 | Kitamura | 707/200 |
| 2006/0129537 A1* | 6/2006 | Torii et al. | 707/3 |

(Continued)

OTHER PUBLICATIONS

"Final Office Action Issued in U.S. Appl. No. 12/930,436", Mailed Date: Oct. 23, 2014, 12 Pages.

(Continued)

*Primary Examiner* — Kaushikkumar Patel
(74) *Attorney, Agent, or Firm* — Aneesh Mehta; Kate Drakos; Micky Minhas

(57) ABSTRACT

A system and method for efficiently storing data both on-site and off-site in a cloud storage system. Data read and write requests are received by a cloud data storage system. The cloud storage system has at least three data storage layers. A first high-speed layer, a second efficient storage layer, and a third off-site storage layer. The first high-speed layer stores data in raw data blocks. The second efficient storage layer divides data blocks from the first layer into data slices and eliminates duplicate data slices. The third layer stores data slices at an off-site location.

20 Claims, 12 Drawing Sheets

(56) References Cited

U.S. PATENT DOCUMENTS

| | | |
|---|---|---|
| 2008/0228834 A1 | 9/2008 | Burchall et al. |
| 2008/0244172 A1 | 10/2008 | Kano |
| 2009/0210914 A1* | 8/2009 | Suzuki .......................... 725/87 |
| 2010/0199036 A1* | 8/2010 | Siewert et al. ................ 711/112 |
| 2010/0257399 A1 | 10/2010 | Brown et al. |
| 2010/0281355 A1 | 11/2010 | White et al. |
| 2010/0332452 A1* | 12/2010 | Hsu et al. ...................... 707/640 |
| 2011/0010514 A1 | 1/2011 | Benhase et al. |

OTHER PUBLICATIONS

USPTO, "Non Final Office Action Issued in U.S. Appl. No. 13/610,567", Mailed Date: Feb. 5, 2015, 16 Pages.

* cited by examiner

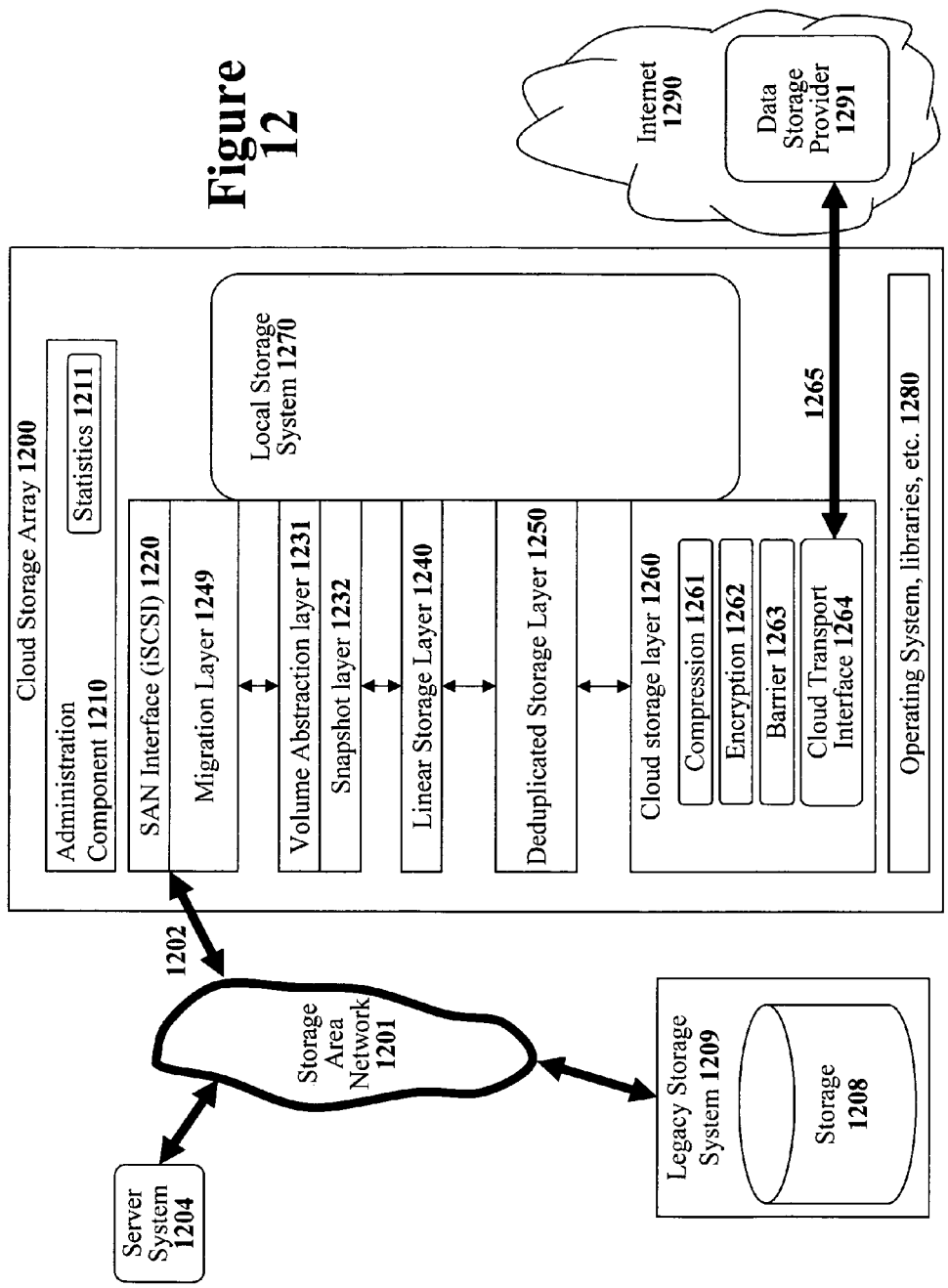

SYSTEM AND METHOD FOR STORING DATA OFF SITE

RELATED APPLICATIONS

The present patent application claims the benefit of the previous U.S. Provisional Patent Application entitled "SYSTEM AND METHOD FOR STORING DATA OFF SITE" filed on Jan. 6, 2010 having Ser. No. 61/335,653.

TECHNICAL FIELD

The present invention relates to the field of digital computer systems. In particular, but not by way of limitation, the present disclosure teaches techniques for storing large amounts of data off-site using a network connection.

BACKGROUND

Computer systems have become an indispensable tool used in modern life. Nearly every business and government agency is dependent upon computer systems for communication, information storage, transaction processing, project development, inventory management, finance, and a large number of other mission critical services.

Although computer hardware and computer software can easily be replaced by an entity using computer systems by purchasing new equipment, the entity's specific data cannot. Thus, data storage and protection is one of the most critical parts of any modern information technology infrastructure.

Recently, online data storage providers have become available that offer reliable data storage services. The stored data is available through the internet and is thus referred to as data stored "in the cloud". Data storage clouds provide storage-on-demand at very low costs while minimizing concerns over capacity planning, storage provisioning, data center space, power, cooling, data backup, replacing failed drives, and tape management.

However, it is currently difficult to user these cloud storage services since the interfaces are not compatible with existing applications. Transitioning to a new system would risk disruption of existing systems. Furthermore, there are concerns about data security. But one of the most difficult aspects is the relatively slow speed of using internet storage systems.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 12 illustrates an embodiment of a cloud storage array that includes a migration layer to simplify migration from a legacy storage system to a cloud storage array.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although some of the example embodiments are disclosed with reference to computer processing systems used for packet-switched networks, the teachings can be used in many other environments such as optimized data transfers to cell phones or other wireless devices on a cellular telephone network. The example embodiments may be combined, other embodiments may be utilized, or structural, logical and electrical changes may be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

Figure 1:
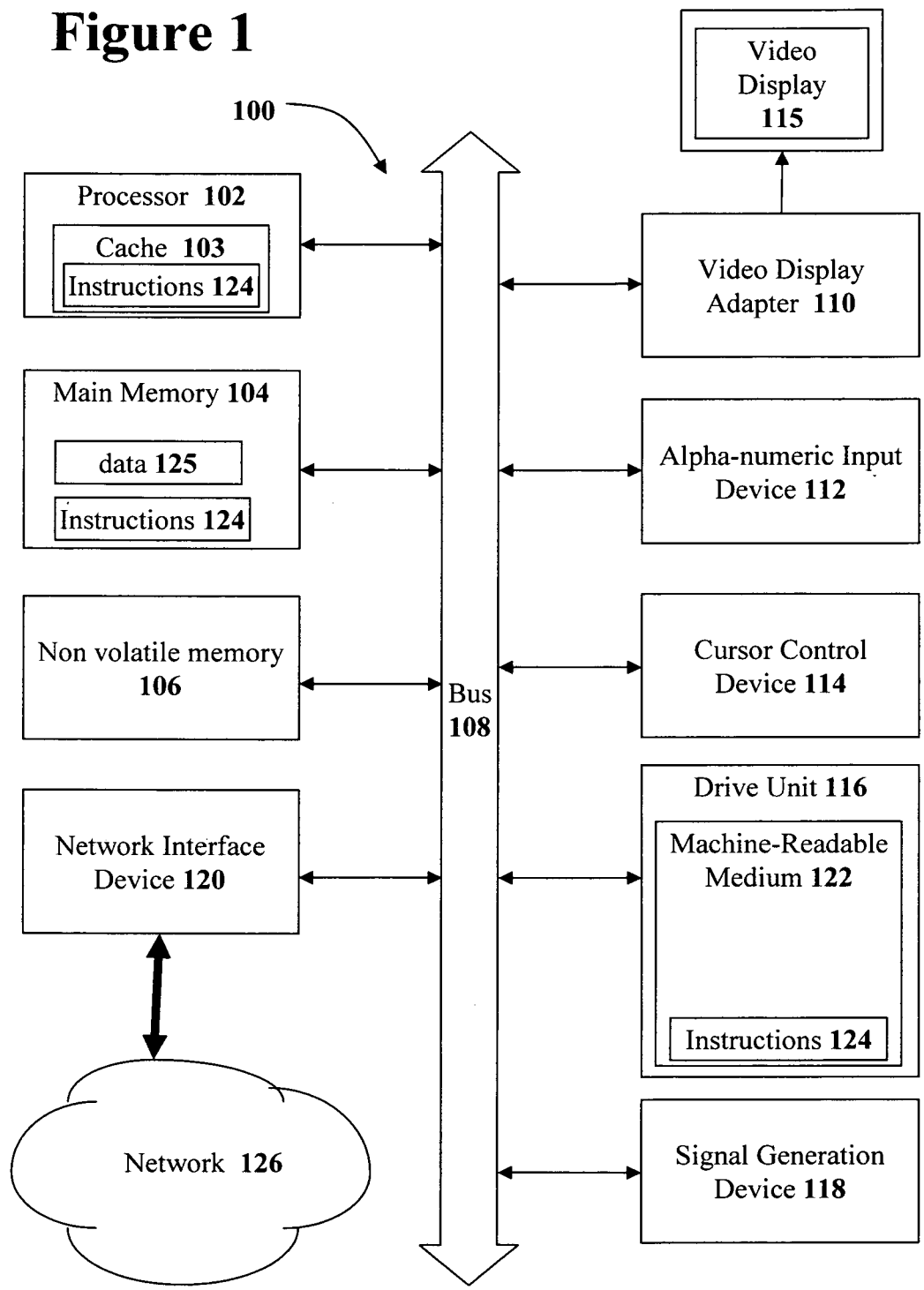
FIG. 1 illustrates a diagrammatic representation of machine in the example form of a computer system within which a set of instructions, for causing the machine to perform any one or more of the methodologies discussed herein, may be executed.

The present disclosure concerns digital computer systems. FIG. 1 illustrates a diagrammatic representation of a machine in the example form of a computer system 100 that may be used to implement portions of the present disclosure. Within computer system 100 of FIG. 1, there are a set of instructions 124 that may be executed for causing the machine to perform any one or more of the methodologies discussed within this document.

In a networked deployment, the machine of FIG. 1 may operate in the capacity of a server machine or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network server, a network router, a network switch, a network bridge, or any machine capable of executing a set of computer instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The example computer system 100 of FIG. 1 includes a processor 102 (e.g., a central processing unit (CPU), a graphics processing unit (GPU) or both) and a main memory 104 and a non volatile memory 106, which communicate with each other via a bus 108. The non volatile memory 106 may comprise flash memory and may be used either as computer system memory, as a file storage unit, or both. The computer system 100 may further include a video display adapter 110 that drives a video display system 115 such as a Liquid Crystal Display (LCD) or a Cathode Ray Tube (CRT). The computer system 100 also includes an alphanumeric input device 112 (e.g., a keyboard), a cursor control device 114 (e.g., a mouse or trackball), a disk drive unit 116, a signal generation device 118 (e.g., a speaker) and a network interface device 120. Note that not all of these parts illustrated in FIG. 1 will be present in all embodiments. For example, a computer server system may not have a video display adapter 110 or video display system 115 if that server is controlled through the network interface device 120.

The disk drive unit 116 includes a machine-readable medium 122 on which is stored one or more sets of computer instructions and data structures (e.g., instructions 124 also known as 'software') embodying or utilized by any one or more of the methodologies or functions described herein. The instructions 124 may also reside, completely or at least partially, within the main memory 104 and/or within a cache memory 103 associated with the processor 102. The main memory 104 and the cache memory 103 associated with the processor 102 also constitute machine-readable media.

The instructions 124 may further be transmitted or received over a computer network 126 via the network interface device 120. Such transmissions may occur utilizing any one of a number of well-known transfer protocols such as the well known File Transport Protocol (FTP).

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, battery-backed RAM, and magnetic media.

For the purposes of this specification, the term "module" includes an identifiable portion of code, computational or executable instructions, data, or computational object to achieve a particular function, operation, processing, or procedure. A module need not be implemented in software; a module may be implemented in software, hardware/circuitry, or a combination of software and hardware.

Storage Area Networks

To make enterprise data centers more efficient, the concept of a storage area network (SAN) was introduced. A storage area network allows computer applications to access remote computer storage devices (such as hard disk arrays, magnetic tape libraries, and optical disc storage devices) in a manner wherein the remote storage devices appear the same as storage devices attached to the local computer system. The use of a storage area network (SAN) allows multiple applications and servers to share storage systems. The use of shared storage simplifies storage administration since fewer storage systems need to be maintained.

Storage area networks simplify the task of creating disaster recovery systems for computer systems. When unforeseen damage (due to man-made or natural disaster) renders a particular storage system inoperable, a mission critical computer system must be able to quickly resume operation. With a storage area network (SAN), an independent secondary storage system located at a distant location can be used to replicate the data being stored on a primary storage system at a primary location. Thus, if a disaster damages the primary storage system at the primary location, the secondary storage system can be brought online to continue operations.

A storage area network generally operates as an integrated part of an operating system. Specifically, the operating system provides the basic file system that is responsible for creating files, writing to files, reading from files, duplicating files, deleting files, and other various file system operations. The storage area network (SAN) operates below the file system and only provides raw logical volume and logical block address level operations.

Figure 2:
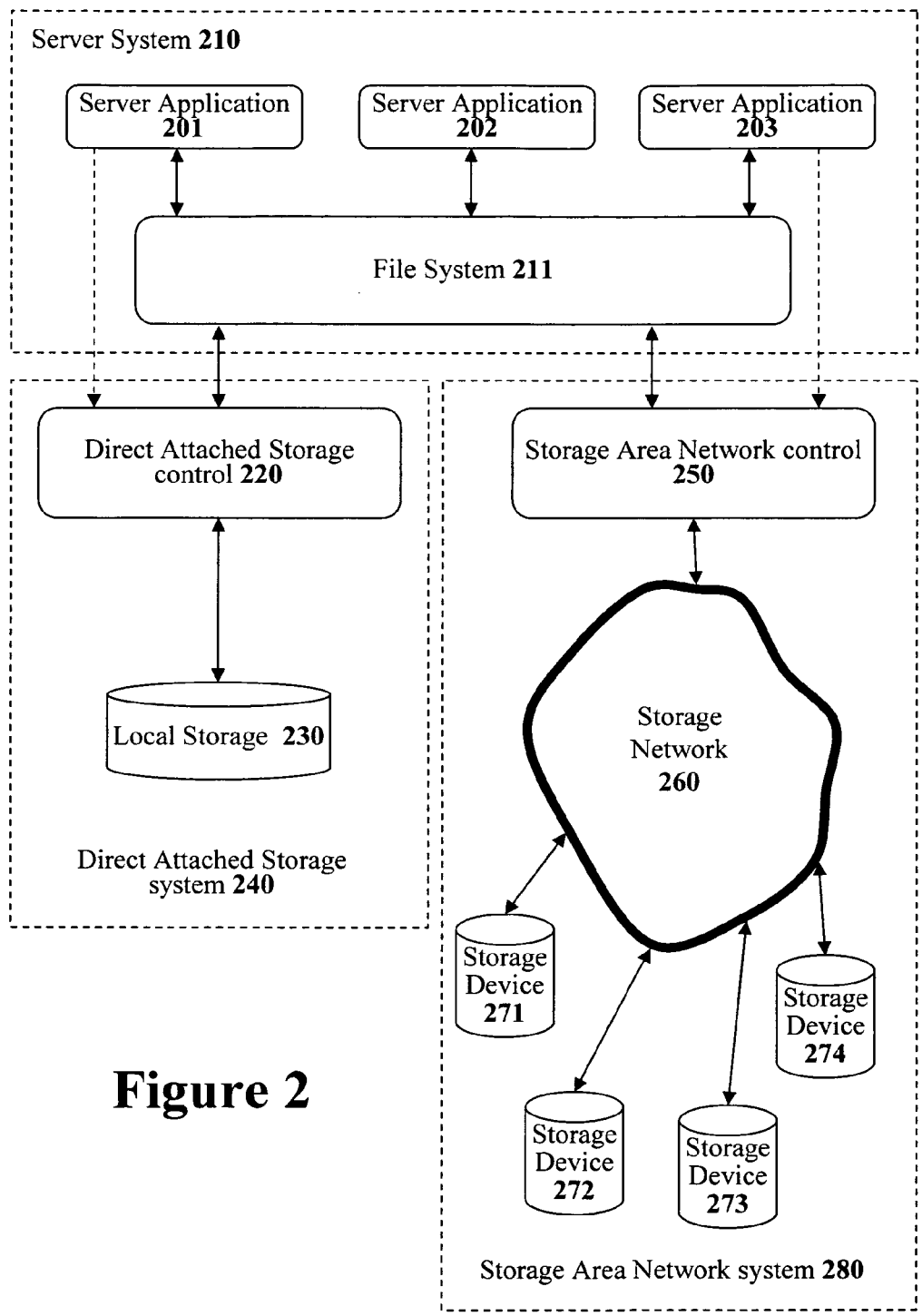
FIG. 2 illustrates a traditional direct access storage system and a storage area network.

The difference between a traditional direct access storage system and a storage area network (SAN) is illustrated in FIG. 2. Referring to FIG. 2, several server applications (201, 202, and 203) are running on a server system 210. The several server applications (201, 202, and 203) will generally write and read data files using a file system 211 that is part of the operating system running on the server system 210. However, applications may also bypass the file system 211 to read and write raw data blocks directly to storage. In a typical computer system with a direct attached storage system 240, the file system 211 accesses a direct attached storage controller 220 to access a local storage system 230. To use a storage area network system 280, the direct attached storage controller 220 is replaced with a storage area network controller 250. Instead of accessing a local storage device, the storage area network controller 250 issues storage requests on a storage area network 260. The appropriate storage device (271, 272, 273, or 274) will respond to the storage request. Applications that bypassed the file system 211 to directly use the direct attached storage system 240 may similarly by pass the file system 211 to directly access the storage area network controller 250 and use the storage area network (SAN) system 280.

With a storage area network system 280, additional storage devices can be added as necessary. Decoupling server systems from their storage components allows the system to be more robust and easier to maintain. For example, if a particular server system malfunctions then that malfunctioning server system can be quickly replaced with a new server system that can immediately access the data for that server which remains available on the storage area network.

Although storage area networks provide many advantages, most small and medium sized enterprises do not create storage area networks. Although the task of providing computer storage may seem to be a relatively simple task, it is neither easy nor inexpensive to design, build, and maintain a high-quality fault-tolerant data storage area network. The storage area network equipment itself tends to be expensive. And even if an entity were willing to purchase the needed storage area network equipment, the creation of a good fault-tolerant storage area network requires cooling systems, back-up power systems, and off-site secondary storage for disaster recovery.

Due to the relatively high costs of deploying and maintaining a high-quality fault-tolerant storage area network, most small entities just use traditional computer server systems that have direct attached storage. The data stored on such computer server systems is typically protected with periodic data back-ups. Although periodic data back-ups provide some data security, periodic data back-ups lack many of the features provided by a high-quality fault-tolerant storage area network. For example, when a problem with a server occurs, it takes time to bring a new server system online and restore the data from most recent back-up. Furthermore, new data that was created since the last back-up operation may be lost. Such systems also generally lack the high-end reliability features such as cooling systems, back-up power systems, and off-site secondary storage for disaster recovery.

Cloud Computing

Figure 3:
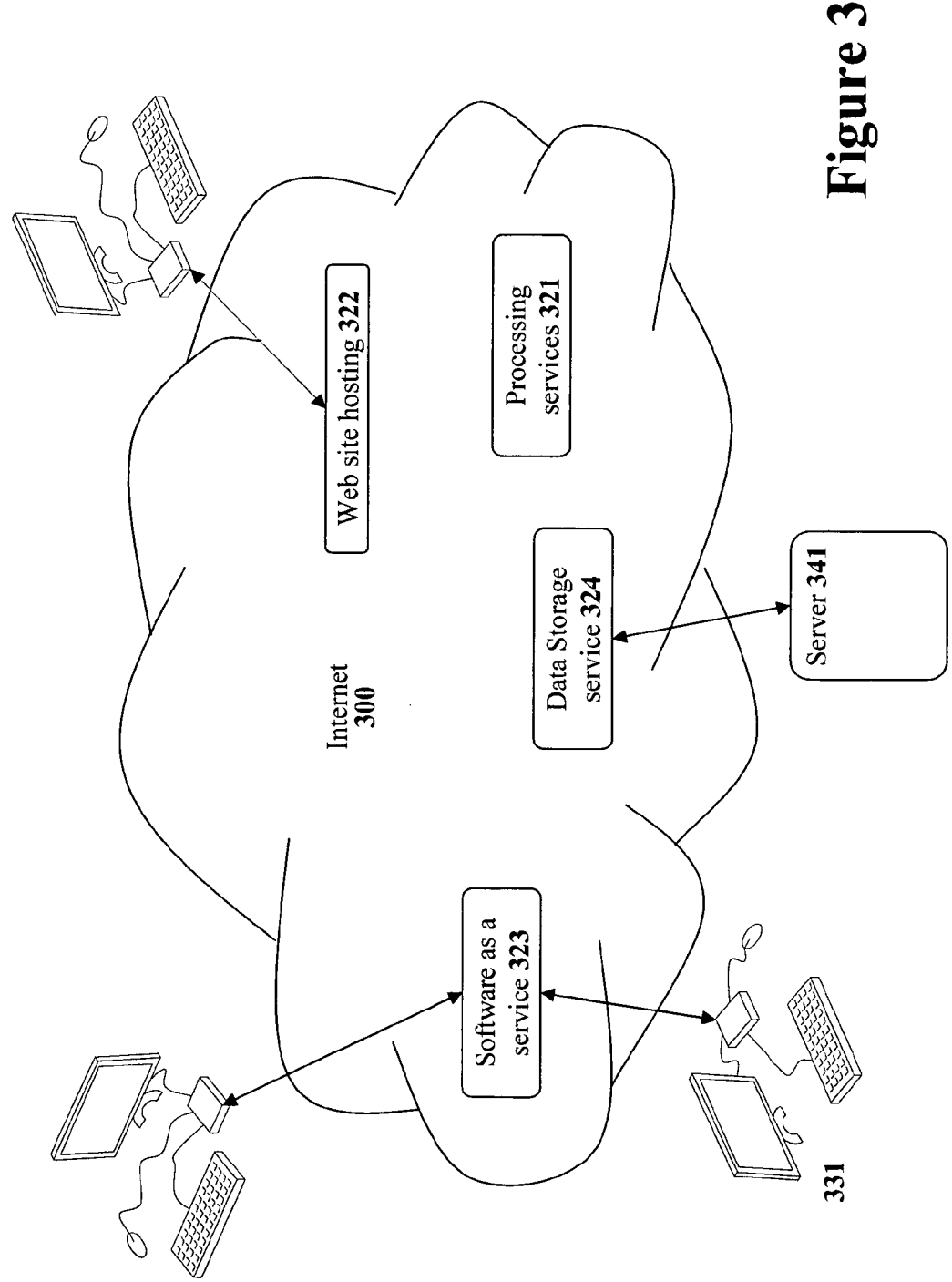
FIG. 3 illustrates a few examples of cloud computing wherein the internet is represented as an abstract cloud.

Cloud computing is a new paradigm for computer usage. With traditional personal computers, a computer user runs applications on a local personal computer system and stores application data on a local storage system. With cloud computing, some or most of the processing and/or data storage is handled by remote computer systems coupled with the internet (the "cloud"). Thus, with cloud computing various technical details are abstracted away from the users who no longer need to maintain the technology infrastructure that resides "in the cloud" (on the internet). The term "cloud" derives from the common usage of drawing a cloud as an abstraction in computer network diagrams. For example, FIG. 3 provides a few examples of cloud computing wherein the internet 300 is represented as an abstract cloud.

Many different forms of cloud computing are presented by cloud computing service providers. Some companies provide computer processing services 321 wherein a customer may provide one or more programs that are to be run on computer systems run by the cloud computing service. Internet website hosting 322 can be viewed as a cloud computing service wherein the cloud computing service provider provides the computer system, the internet connection, the storage, and a web server application such as Apache. This is a very commonly used cloud computing service since web sites require good reliable internet connections thus it is best to locate web servers at internet service provider facilities.

Many cloud computing providers offer "software as a service" 323 wherein various user application programs are made available to users. For example, a typical cloud computing user application provider allows users to run desired application programs on a remote server across the internet. The users access the user application programs using a client system 331. The client system 331 may be a web browser or a thin-client system that simply accepts user input (in the form of keyboard and mouse input) and displays video output. In such a cloud computing model, the user application software and data are stored on remote server systems that are accessible on the internet 300. Thus, the application user does not need to maintain the software application (with patches and upgrades), the computer system hardware that executes the software application, or the data storage system used to store application data. The user simply needs an appropriate client system 331 and connection to the internet 300.

One relatively simple form of cloud computing is a remote data storage service 324. With remote data storage services, the cloud computing provider receives and reliably stores data for the benefit of the customer. Although this may seem to be a relatively simple service, it is neither easy nor inexpensive to design, build, and maintain a high-quality fault-tolerant data storage system as set forth in the previous section.

If a small entity were easily able to outsource the creation of a fault-tolerant data storage system to a cloud computing provider that offers data storage services, then that small entity would be relieved of a very difficult information technology task. However, at the present time it is not very easy to use cloud computing storage systems. Specifically, there are several compatibility, security, and performance issues that prevent most small entities from using such cloud computing storage systems.

A first problem is that most cloud computing based storage services do not provide an interface that is easy for a small entity to use. A typical cloud computing based storage service uses the REpresentational State Transfer (REST) system for data transport. With a typical cloud computing based storage service, customers are allowed to create "objects" of data that are named and transported to the storage service. Some implementations use the standard the Hypertext Transport Protocol (HTTP). The REST data system works well for communication between a client application and server system. However, it is not designed to handle raw data transfers handled by storage systems.

Another problem with the use of cloud computing based storage services is data security. Computer systems are often used to store highly confidential information such as credit card numbers, trade secrets, financial data, medical records, etc. Thus, there are financial, moral, legal, and economic reasons to avoid using any external data storage service that cannot be fully trusted. Furthermore, even if one fully trusted a cloud storage service provider, the data communication link between the customer and the cloud computing based storage service itself could be monitored by others.

Even if the interface compatibility and security issues could be addressed, one of the greatest challenges in using a cloud computing based storage service is the relatively slow speed of such internet-based data storage services. The rate at which data can be transmitted to and received from a cloud computing based storage service is limited by the internet connection between an entity and the cloud computing based storage service. Due to these various difficulties, the adoption of cloud computing data storage services has been limited.

Using Cloud Storage with Storage Area Networks

To provide small and medium sized entities with a high-quality fault-tolerant storage system, the present disclosure introduces a hybrid storage system that combines advantages and flexibility of a storage area network with the reliability and infinite capacity of an outsourced cloud based data storage system. The hybrid storage system is referred to as a "cloud storage array". The cloud storage array couples to local server systems with a first interface using standard storage area network protocols to provide data storage for the local server systems. The cloud storage array is also coupled to a cloud storage provider through a second interface using an interne network connection in order to take advantage of the benefits of a reliable cloud based data storage service.

The use of a storage area network interface on the cloud storage array allows administrators to use the cloud storage array like a conventional storage area network storage device.

Multiple server systems may share a cloud storage array using a standard storage area network.

The use of a second interface coupled to a cloud storage provider allows the cloud storage array to provide infinite storage resources that can be used as needed. Furthermore, the use of an outsourced cloud storage system provides many of the features generally only available in high-end data center such as cooling systems, back-up power systems, off-site secondary storage systems.

Figure 4:
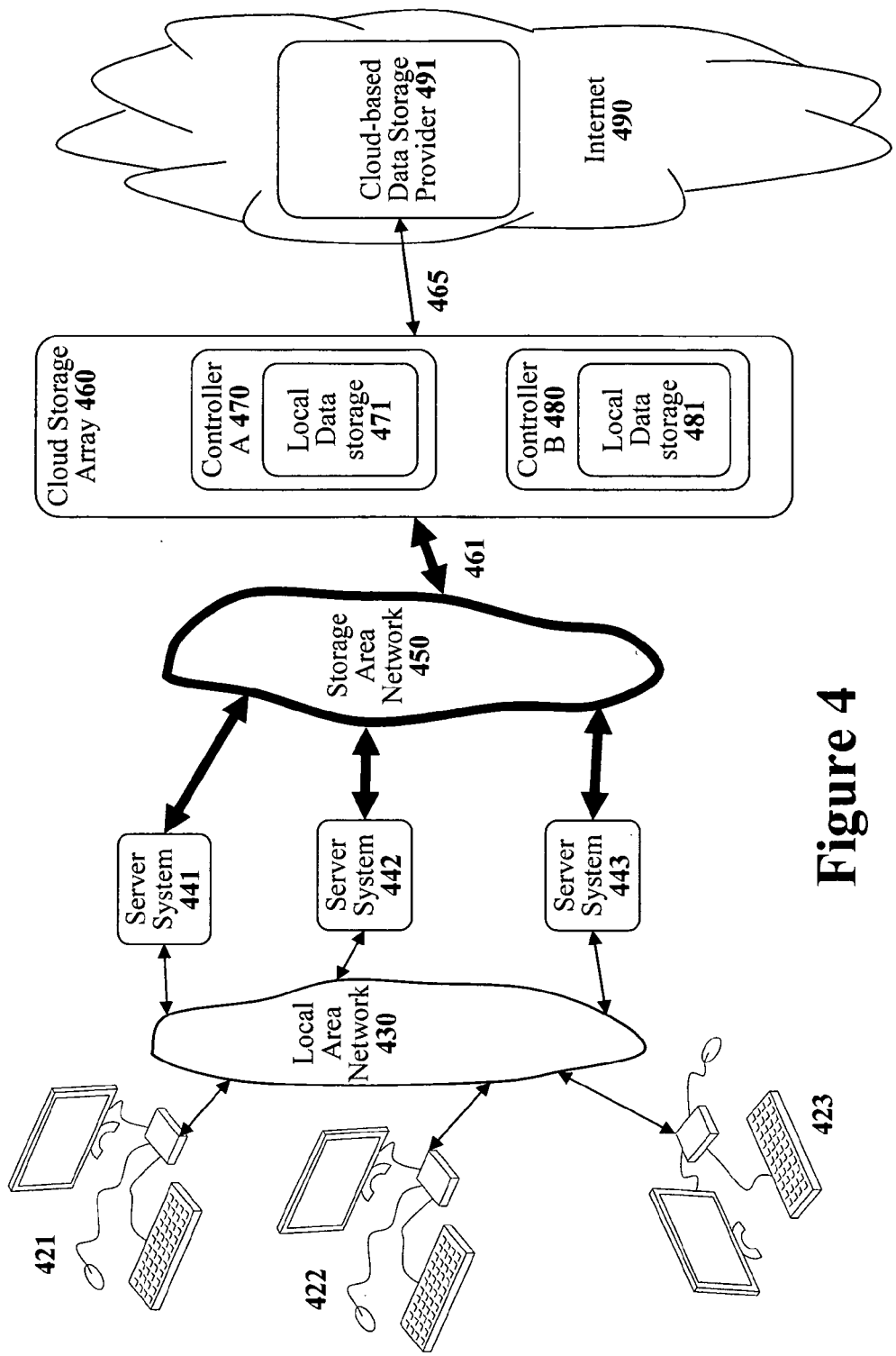
FIG. 4 illustrates a conceptual diagram of how a cloud storage array can be used to provide reliable data storage services to several server systems on a local area network.

FIG. 4 illustrates a conceptual diagram of how a cloud storage array 460 can be used to provide reliable data storage services to a local area network. Referring to FIG. 4, a typical local area network has multiple user workstations (421, 422, and 423) coupled to a local area network 430. In addition to the user workstations, a typical office network also has multiple server systems (441, 442, and 443) that provide various services to the users at the user workstations (421, 422, and 423). Typical servers include an email server for sending and receiving email, a database server for storing specific structured data, and file server for storing general user files.

As set forth in an earlier section, storage area networks allow network administrators to decouple the data storage function away from server systems such that only a single unified data storage system needs to be maintained. Thus, all of the server systems (441, 442, and 443) are coupled to a storage area network 450 that is used to handle raw data storage reads and writes. A cloud storage array 460 is coupled to the storage area network 450 to handle data storage operations for the storage area network 450. (Note that additional cloud storage arrays or conventional storage devices may also be coupled to the storage area network 450 for additional storage.)

In the particular embodiment of FIG. 4, the cloud storage array 460 includes two different controller units: controller A 470 and controller B 480. These two different controller units may be used to provide a fault-tolerant mirrored storage system wherein either controller can take over if the other unit fails. Alternatively, the two controllers (470 and 480) may be used to "statically load balance" data volumes so that the controllers are each servicing half of the data storage requests while both controllers are healthy thereby increasing performance. When either controller fails in such a configuration, the remaining functioning controller takes on double workload, slowing down to some degree but providing continuous availability for all of the data volumes.

Controller unit A 480 and controller unit B 480 each have a local data storage (471 and 481, respectively). The local data storage (471 and 481) handle all data write operations from the server systems (441, 442, and 443). The local data storage (471 and 481) also handle data read operations for data portions that happen to be stored in the local data storage (471 and 481). The cloud storage array 460 attempts to keep all frequently accessed data within the local data storage (471 and 481) such that the vast majority of read operations can be handled locally. However, only a subset of all the available data will reside in local data storage (471 and 481) due to size limitations. The remainder of the data will be stored with a cloud-based data storage provider 491 available on the internet 490. This allows the user of the cloud storage array 460 to take advantage of an infinitely large storage system that is professionally maintained by experts (the data stored in the cloud-based data storage provider 491) while having local storage performance for frequently accessed data (the data stored in the local data storage 471 and 481).

As illustrated in FIG. 4, the cloud storage array 460 acts as an intermediary between an on-site storage area network 450 and an off-site cloud-based data storage provider 491. As set forth in the previous section on cloud computing, the cloud storage array 460 must reconcile the significant differences between the front-end interface 461 to the local storage area network 450 and the back-end 465 interface to the cloud-based data storage system 491 on the internet 490.

One the most significant differences between the two interfaces on the cloud storage array 460 is the differential in speed between the connection 461 to the storage area network 450 and the connection 465 to the cloud-based data storage provider 491. For example, the storage area network 450 may operate at speeds of one gigabit per second and the internet connection 465 to the data storage provider 491 may operate at ten megabits per second.

To compensate for the speed differential, the cloud storage array 460 takes advantage of the manner in which data storage systems are generally used. Most data storage systems only need to handle a relatively small amount of dynamic information that changes frequently. For example, an email server needs to receive and store new email messages every day and a file server needs to handle a limited number of files that are actively being used. However, most of the information stored on a large data storage system is generally static and/infrequently accessed. For example, file servers may store archives of old documents and data related to projects that are no longer active. Thus, since only a relatively small amount of data stored in a large data storage system is actively used, that limited amount of active data can be stored in a large local data storage (471 and 481) that can be repeatedly accessed at a high data rate and with low latency. The data that is rarely accessed can be stored at the cloud-based data storage provider 491 and retrieved when necessary. Accessing data from the cloud-based data storage provider 491 will often result in increased latency, however, such latency may be acceptable in certain applications or use patterns.

A core concept of the cloud storage array 460 is efficient use of the local data storage available in the cloud storage array 460. As long as the cloud storage array 460 accurately determines the data that is most frequently accessed and keeps that data in the local data storage (471 and 481), the vast majority of storage requests (both reads and writes) received on the connection 461 to the storage area network 450 can be serviced using only the local data storage (471 and 481). This will greatly reduce the amount of traffic on the connection 465 to the cloud-based data storage provider 491 thus hiding the speed differential between the two interfaces from users of the cloud storage array 460. To most efficiently use the local storage available within the cloud storage array 460, the cloud storage array 460 uses both intelligent caching algorithms and storage space optimization techniques. The caching algorithms attempt to keep the most frequently accessed data in the local storage and use intelligent buffering systems like read-ahead caching to prevent cache misses. The storage space optimization techniques make the most of the available memory by using techniques such as the identification and elimination of duplicated data.

In one embodiment, the large local data storage systems (471 and 481) are implemented with Solid State Drive (SSD) systems. Solid state drive systems are generally implemented with a nonvolatile memory technology such as Flash memory. Using flash memory instead of hard disk drives that are used in most storage area network device provides several advantages. For example, flash memory is faster, uses less power, generates less noise, and is more reliable than hard disk drive storage. Thus, as long as a desired data item is available in a flash memory based local data storage system (471 or 481), that data may be returned faster than from a traditional hard disk based storage device.

Although this document will concentrate on system that uses flash memory for the local data storage systems (471 and 481), other technologies may also be used such as hard disk drives, battery backed RAM memory, and any combination of these storage technologies. Various different storage technologies may be combined in a tiered manner. For example, battery-backed dynamic random access memory (DRAM) may be used for very frequently accessed data, flash memory may be used for frequently accessed data, hard disk drives may be used for less frequently accessed data, and a cloud-based storage system may be used for data that is rarely accessed. In this manner, the strengths of each different storage system may be taken advantage of. Furthermore, the administrator of the cloud storage array 460 may be allowed to allocate and configure data storage in an application dependent manner. For example, if a particular application uses a certain set of data infrequently but when that data is accessed a low latency response is needed then an administrator may be allowed to specify this limitation for that application or for that specific data such that the cloud storage array 460 does not store that data with the cloud-based storage provider 491. Other data sets may be explicitly marked as 'archive' data such that such archive data is quickly sent off to the cloud-based storage provider 491. This prevents such archive data from taking up memory space in the local storage system until the caching system determines the data is not being accessed.

Cloud Storage Array Architecture

Figure 5:
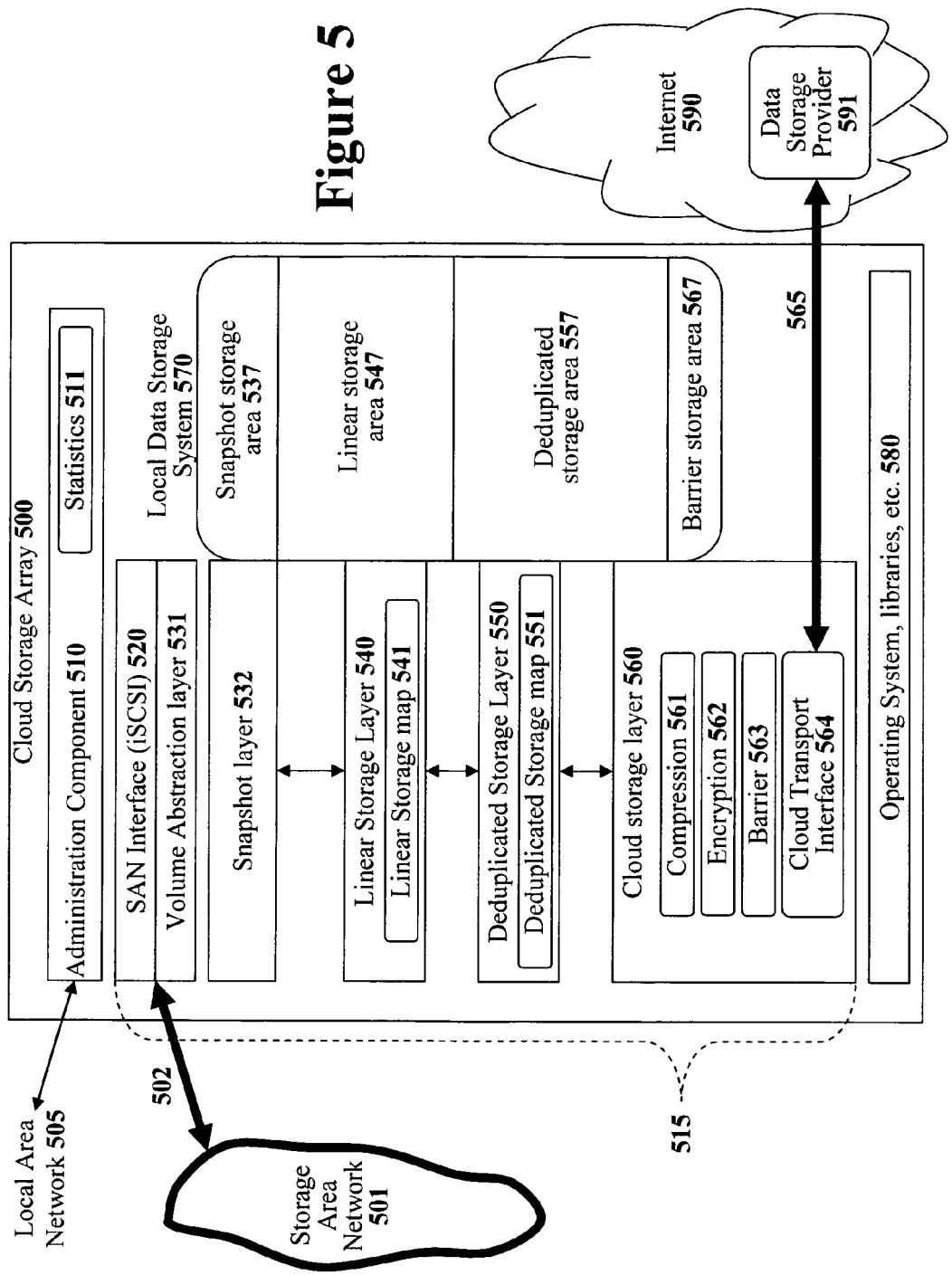
FIG. 5 illustrates a block diagram of one embodiment of an architecture that may be used to build a cloud storage array.

To successfully build the cloud storage array 460 of FIG. 4, a novel storage system architecture was developed. The storage architecture was designed to handle the unique technical challenges that had to be overcome in order to provide the desired functions. In addition to many of the requirements for a typical high-quality data storage system (such as host multi-pathing, volume creation & management, back-ups & restore, RAID configurations, etc.), the cloud storage array 460 needs to handle the following issues:

Protocol translation from the SAN front-end to the cloud back-end
  Eliminating the latency of cloud storage using local data storage
  Data snapshots for backup/restore in a distributed storage system
  Reduction of back-end bandwidth requirements to access the cloud
  Encryption of data stored off-site for security FIG. 5 illustrates a conceptual block diagram of one embodiment of an architecture used to build a cloud storage array. As illustrated in the block diagram of FIG. 5, the front-end interface 502 of cloud storage array 500 is coupled to a storage area network (SAN) 501 to receive storage requests from local systems (not shown). The back-end interface 565 is coupled to a cloud based data storage provider 591 with an internet connection.

The front-end interface 502 will generally use typical storage area network protocols. Examples include the industry standard Internet Small Computer System Interface (iSCSI) protocol and the Fiber Channel Protocol (FCP). These protocols allow storage clients to perform operations such as start, stop, read, write, and format on storage units addressed by logical unit numbers (LUNs).

The back-end interface 565 will generally use some type of REST-ful protocol on an internet connection. The back-end interface will generally allow the cloud storage array 500 to issue commands such as create a data storage object, update an object, read an object, deleting an object, and list objects. The cloud storage array 500 addresses the individual data objects using some type of unique object identifier that it must create for each data storage object.

In between the front-end interface 502 and the back-end interface 565, the cloud storage array 500 contains a complex system for responding to data storage requests using a local data storage system 570 when possible or responding to data storage requests with the help of the data storage provider 591 when necessary. The system for handling data storage requests is implemented in a manner similar to a typical protocol stack made up of independent protocol layers. This document will refer to the layered system for handling data storage requests as the data storage request handling stack 515. The details of the data storage request handling stack 515 will be disclosed layer by layer.

The top layers 531 handle some formalities in processing storage requests. Beneath the formality layers are at least three different layers that actually handle the storage of data. A first data storage layer, the linear storage layer 540, is optimized for quickly handling raw data. A second data storage layer, the deduplicated storage layer 550, is optimized for organizing data that has been received and locally storing the data in a more space efficient manner. And a third data storage layer, the cloud storage layer 560, is optimized for limitless storage size by storing data off site at a data storage provider 591. All three of these data storage layers use the local data storage system 570 to some degree. In one embodiment, the linear storage layer 540 stores uses approximately 35% to 45% the available storage space, the deduplicated storage layer uses approximately 50% to 60% the available storage space, and the cloud storage layer 560 uses approximately 5% the available storage space of the local data storage system 570. These values may be configurable to optimize the system for a particular installation. In one embodiment, the system uses a heuristics to dynamically adjust the storage allocations in order to automatically optimize the performance of the system.

Referring to FIG. 5, at the top of the cloud storage array 500 block diagram is an administration component 510. The administration component 510 is not part of the storage request handling stack but is instead a system for configuring, controlling, and monitoring a cloud storage array 500. For example, the administration component 510 can be used to schedule periodic snapshots of the data in the cloud storage array 500. An administrator may access the administration component 510 of the cloud storage array 500 through an interface coupled to a local area network 505.

For the initial configuration, an administrator specifies which virtual storage to expose to hosts on the storage area network (SAN) 501. This is similar to legacy systems where the administrator specifies which LUNs in a storage array to expose to hosts. The administrator also specifies the addresses and access information for the cloud storage provider that will be used. The administrator may specify a storage limit but this is generally not advisable since the system should be allowed to grow as needed. The administrator may also specify bandwidth constraints of the communication link to the data storage provider and bandwidth constraints of the data storage provider itself (the maximum rate at which the data storage provider will handle read and write requests). The bandwidth constraints of the communication link can be used to ensure that the cloud storage array 500 does not attempt to send data faster than the communication link can handle the data. Furthermore, if the communication link is shared by other users (such as an internet connection shared with human users, mail servers, and other internet link users), the cloud storage array 500 can be configured to use less than the full bandwidth available on the communication link.

The administration component 510 will collect operation statistics 511 that may be used to gauge the performance of the cloud storage array 500. The operation statistics 511 may be analyzed and used to alter the configuration of the cloud storage array 500 for improved performance. Each layer in storage request handling stack may generate its own individual statistics. The administration component 510 may periodically poll the different storage request handling layers and various other parts of the cloud storage array 500 to create a centralized collection of all the system statistics.

The core of the cloud storage array 500 is made up of the storage request handling stack. The storage request handling stack starts at the top with storage area network interface 520 and travels down through a volume abstraction layer 531, a snapshot layer 532, a linear storage layer 540, a deduplicated storage layer 550, and finally to a cloud storage layer 560. Each of these layers in the storage request handling stack will be described in further detail individually.

Front-End Interface and Initial Layers

At the top of the storage request handling stack is the storage area network interface 520. In one particular implementation that will be considered in detail, the storage area network interface 520 implements the well-known iSCSI protocol that is used to accept SCSI commands carried on a TCP/IP network. However, any other storage protocol may be implemented at the top of the storage request handling stack.

The storage area network interface 520 exposes iSCSI volumes to hosts on the storage area network (SAN) 501. The storage area network interface 520 then receives iSCSI data storage requests from the hosts such that the cloud storage array 500 must respond to those requests. The storage area network interface 520 parses these iSCSI commands and determines how the commands should be handled. Many of the iSCSI requests that are not directly related to reading and writing can be handled by the storage area network interface layer 520. Storage requests that cannot be handled by the storage area network interface layer 520 are passed down the storage request handling stack 515 to the next layer.

Beneath the storage area network interface layer 520 is a volume abstraction layer 531. The volume abstraction layer 531 handles many of the formalities in keeping track of the different volumes stored by the cloud storage array 500. For example, the volume abstraction layer 531 keeps track of the volumes that exist, the size of each volume, access control lists (ACLs), and other administrative information. Thus, the volume abstraction layer 531 handles some of the volume management tasks such that the lower layers can concentrate on actual data storage.

Snapshot Layer

The layer beneath the volume abstraction layer 531 is a snapshot layer 532. The snapshot layer 532 is used for taking "snapshots" of specified volumes in the cloud storage array 500. In the present disclosure, a snapshot is the state of a volume at a particular moment in time. However, it is impractical (if not impossible) to actually make an instant copy of all the data in a particular volume. Instead, the snapshot layer 532 creates a new volume that initially only consists of a time map for the snapshot volume that specifies when the snapshot was taken and a pointer to the parent volume. If there are no new writes to the parent volume, then the current data of that parent volume can be used as the data for the snapshot volume. However, when a new write is received that changes data in the parent volume that is referenced by the snapshot volume, the old existing data must be copied out of the parent volume and placed in the snapshot volume before the write occurs in order to save the data that existed when the snapshot was created. The copying of the old data when a new write operation is received is known as a "copy-on-write" operation that is used to build the snapshot volume from the parent volume. In addition, the snapshot layer 532 may use also use a system known as Copy-Reference-On-Write (CROW) that makes a copy of a reference to another volume. This reduces the amount of storage required when multiple dependent snapshots exist and one snapshot may refer to data in another snapshot as long as the two snapshots are aligned in time.

To take a snapshot of a data volume, the snapshot layer 532 first freezes access to a particular volume. Then the snapshot layer 532 creates an age volume map for the volume. The age volume map consists of age entries for all the data for the volume (including data within the local storage and data stored in the cloud storage). Then, the snapshot layer 532 unfreezes the data volume such that the data volume may continue to be used. However, the snapshot layer 532 will now examine every read and write to the volume in order to protect the data associated with the snapshot volume.

When a read is received for data volume that has had a snapshot taken, the read is processed as normal. When a write is received for data volume that has had a snapshot taken, the system determines if this is the first new write to a particular area of data since the snapshot was taken. If so, the existing data is copied and placed into a snapshot storage area to preserve the data.

Snapshot volumes themselves may also be read from and written to. When a read is received for a snapshot volume, the snapshot layer 532 will first determine if the data is within the snapshot storage area. If the data is within the snapshot storage area, the snapshot layer 532 will use that data (which was preserved due to an incoming write that would have destroyed the old data) to service the read request. If the requested data is not within the snapshot storage area, the snapshot layer 532 will then fetch the requested data from the parent volume (which has not yet changed or else the data would have been stored in the snapshot storage area).

When a write is received for a snapshot volume, the snapshot layer 532 will first determine if it has the current data for the volume in the snapshot storage area. If it does not yet have the data within the snapshot storage area, the snapshot layer 532 will first fetch the data from the parent volume (which has not yet changed yet) and place that data in the storage area. Then snapshot layer 532 will then overwrite the old data in the storage area with the new data being written to the snapshot volume.

In one embodiment, the copy-on-write policy of the snapshot layer 532 may be configured to make data copies propagate to the data storage provider 591. In this manner, when a snapshot is taken the data contents of the snapshot will be preserved in the data storage provider 591. This allows back-up snapshots to be stored at the data storage provider 591 such that no local back-up media system is required. However, since the bandwidth on the connection 565 to the data storage provider 591 is generally limited, this is a very slow procedure. Furthermore, this may consume needed bandwidth on the connection 565 for normal operations. Thus, such a system may be instructed to only send data when bandwidth is available or only during non peak times (such as overnight).

High-Speed Linear Storage Layer

After performing any needed snapshot operations in the snapshot layer 532, a data storage request is then passed to the linear storage layer 540. The linear storage layer 540 is the first level of actual data storage in the cloud storage array 500. The linear storage layer 540 is designed to handle "hot" data that is frequently accessed and changed. To provide fast performance to the hosts for this hot data, the linear storage layer 540 is optimized for speed.

The linear storage layer 540 will generally receive data storage requests addressed in traditional data storage terms such as logical volumes and logical block address (LBA) ranges. As set forth earlier, the front-end of the cloud storage array 500 can implement many different possible data storage protocols that use different data storage addressing systems. However, as long as the cloud storage array 500 properly responds to data storage requests received, the cloud storage array 500 is free to use any different type of addressing system internally. In the cloud storage array 500, data will often be stored in nonvolatile memory or with a cloud based data storage provider instead of on a disk system like a traditional storage system. Thus, an addressing system more suited to storing information in a memory system will be used within the cloud storage array 500 instead of the more disk-centric addressing system used by the storage area network interface 520.

In one embodiment, the cloud storage array 500 uses a flat linear addressing system for each volume wherein each logical volume is divided into fixed sized blocks. A very simple translation system can be used to translate data requests made in terms of logical block address (LBA) ranges on a disk (or any other data storage addressing system) into the linear memory addressing system used within the cloud storage array 500. In one specific embodiment, each fixed-size block is one megabyte long and each block may be handled either by the linear storage layer 540 or a lower data storage layer. Data stored by the linear storage layer 540 is always stored in the local data storage 570.

To keep track of where the all the data is stored, the linear storage layer 540 maintains a linear storage map 541. The linear storage map 541 specifies where data resides (and thus how the data may be obtained). For data blocks that are stored by the linear storage layer 540, the linear storage map 541 may specify a specific physical memory address in the local data storage 570. For data that is not stored by the linear storage layer 540, the linear storage map 541 may specify a set of data fingerprints used to uniquely identify data slices in lower levels of the storage request handling stack 515 such as the deduplicated storage layer 550 and the cloud storage layer 560. In one embodiment, a thirty-two byte long SHA-256 fingerprint is used to uniquely identify data slices stored in the lower storage layers.

Figure 6:
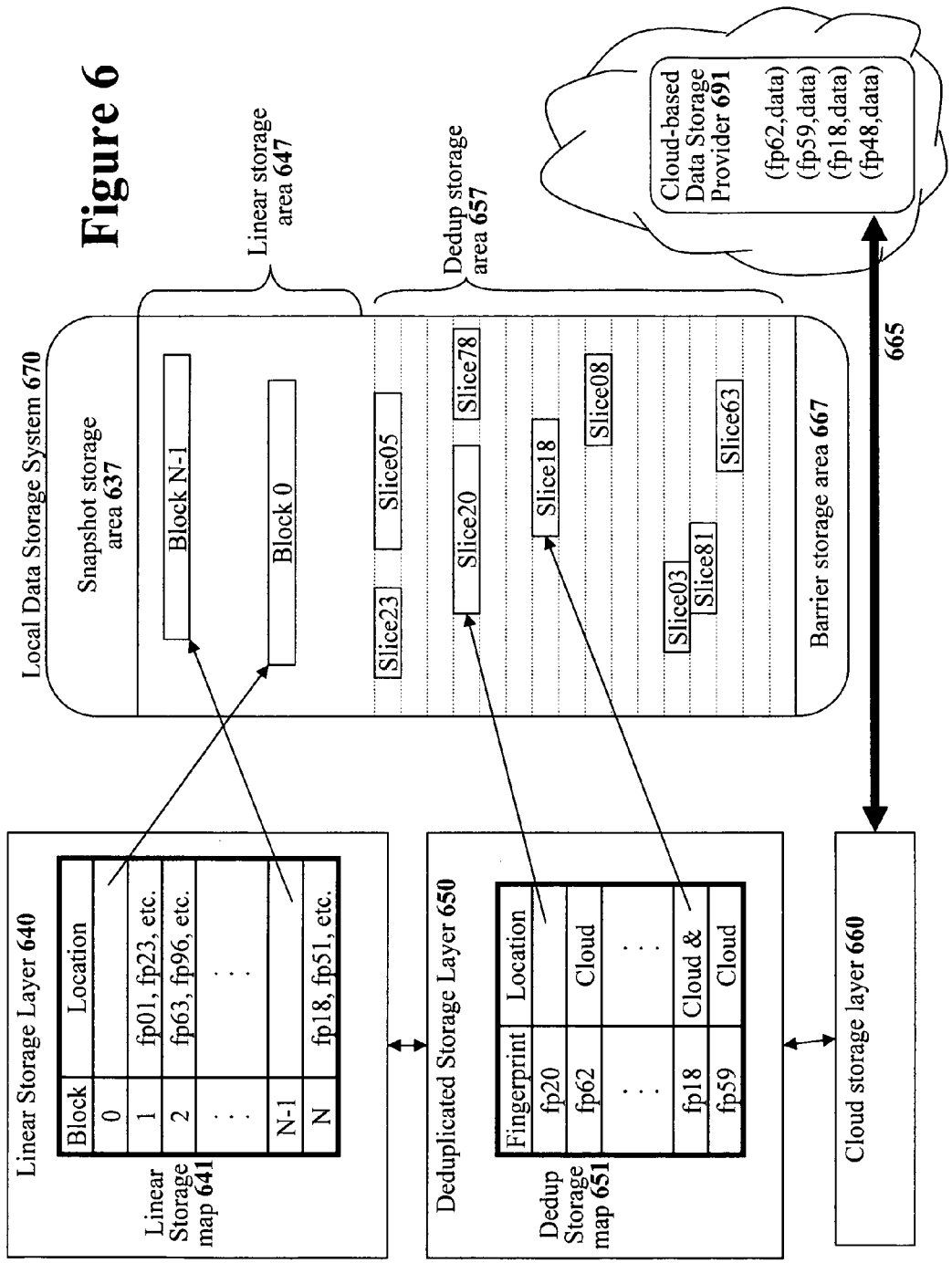
FIG. 6 conceptually illustrates the data storage layers of the cloud storage array depicted in FIG. 5.

FIG. 6 conceptually illustrates how the various data storage layers use the local data storage system 670. (Note that FIG. 6 is conceptual only and that many details are omitted for clarity.) The linear storage layer 640 uses a linear storage map 641 that maps each (fixed-size in one embodiment) block either to a location in a linear storage area 647 of the local data storage system 670 or provides the identifiers for fingerprints that represent the data. The fingerprint identifiers are used to locate the requested data in lower layers of the storage request handling stack. In the example of FIG. 6, block 0 is stored in the linear storage area 647 as indicated by a pointer. Block 1 is stored in lower data storage layer(s) since the linear storage map 641 specifies a set of fingerprint identifiers. Each of the fingerprint identifiers specifies a data slice in the block. The set of data slices is equal to the size of a data block (which is 1 megabyte in one particular embodiment).

The linear storage map 641 may be implemented with an ordered linked list that links together entries that each contain a pointer to a block of data in the linear storage area 647 or a fingerprint of data stored in a lower layer. For the data stored in lower layers, the linked list will contain a series of entries with fingerprints where the total size of the data slices referred to by the fingerprints equals one block size. To provide optimal performance, the linked list may also have an additional data structure used to improve the search of the linked list. For example, a red-black tree, a hash table, or another similar data structure whose elements are pointers to the linked list nodes may be used to improve the speed of searching the linked list.

Figure 7:
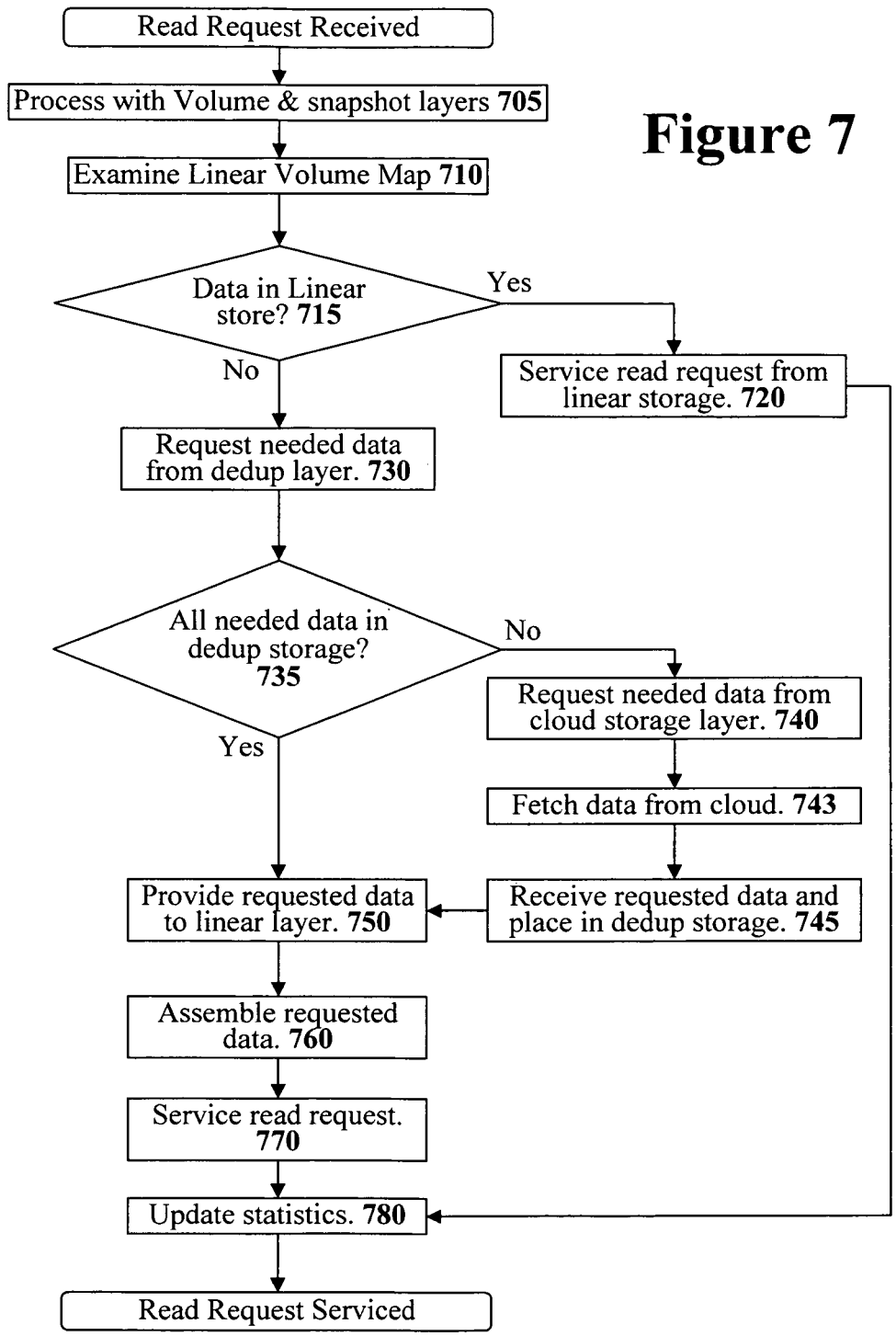
FIG. 7 illustrates a flow diagram describing how a cloud storage array may service a read request.

A description of how the linear storage layer 640 handles read requests will be disclosed with reference to a flow chart in FIG. 7 and the conceptual diagram of FIG. 6. Referring to FIG. 7, a read request is received from a host client at the top of the flow chart. The read request is first processed by the SAN interface, volume abstraction, and snap shot layers at stage 705. The read request is then passed to the linear storage layer 640.

The linear storage layer 640 first examines the linear storage map 641 at stages 710 and 715 to determine how to respond to the read request. If the requested data is available in the linear storage area 647 of the local data storage system 670 then handling the response can be done very quickly and easily. Specifically, the linear storage layer 640 simply reads the data from the linear storage area 647 and responds to the read request at stage 720. The system may then update some statistics (such as statistics used to determine if the data is hot, warm, or cold) at stage 780 and it is done handling the read request.

If the data was not found to be in the linear storage area 647 at stage 715, then the linear storage layer 640 requests the needed data from lower layers of the storage request handling stack at stage 730. The request is made by providing the fingerprints of the needed data items. Note that a request may only need a few slices of data if the storage read request only requested a small amount of data within a particular block of data. In this particular embodiment, the next lower layer is the deduplicated storage layer 650 in FIG. 6. This document may use the term 'dedup' when referring to aspects the deduplicated layer.

At stage 735, the deduplicated storage layer 650 examines the deduplicated storage map 651 to determine if it has all the requested data slices in the deduplicated storage area 657 of the local data storage system 670. If the deduplicated storage layer 650 does have all the needed data slices, then the deduplicated storage layer 650 can respond with the requested data at stage 750. If the deduplicated storage layer 650 does not have all the needed data slices, then at stage 740 the deduplicated storage layer 650 will request the needed data items from the next lower layer of the storage request handling stack, the cloud storage layer 660 in this embodiment.

At stage 743 the cloud storage layer 660 fetches the requested data from the cloud storage provider 690. (More details on this stage will be presented in the section on the cloud storage layer 660.) Upon receiving the requested data, the deduplicated storage layer 650 will place the requested data into the deduplicated storage area 657 of the local data storage system 670. The deduplicated storage layer 650 can then respond to the linear storage layer 640 with the requested data at stage 750.

Upon receiving the requested data slices from deduplicated storage layer 650, the linear storage layer 640 will assemble the requested data from the received data slices at stage 760. Finally, the linear storage layer 640 can then respond to the read request with the requested data at stage 770. The statistics counters can then be updated at stage 780.

It can be seen that servicing the read request at stage 720 will be faster than servicing the read request when the data must be fetched from the lower data storage layers. This is especially true if data slices must be fetched from the cloud-based data storage provider 691.

Write requests are handled in a similar manner. All write operations to the cloud storage array are initially written into the linear storage are 647 associated with the linear storage layer 640. The handling of a write request will be disclosed with reference to the flow chart of FIG. 8 and the conceptual diagram of FIG. 6. The example of FIG. 8 describes a write to a single data block. However, the same steps may be performed multiple times to handle writes to multiple data blocks.

Figure 8:
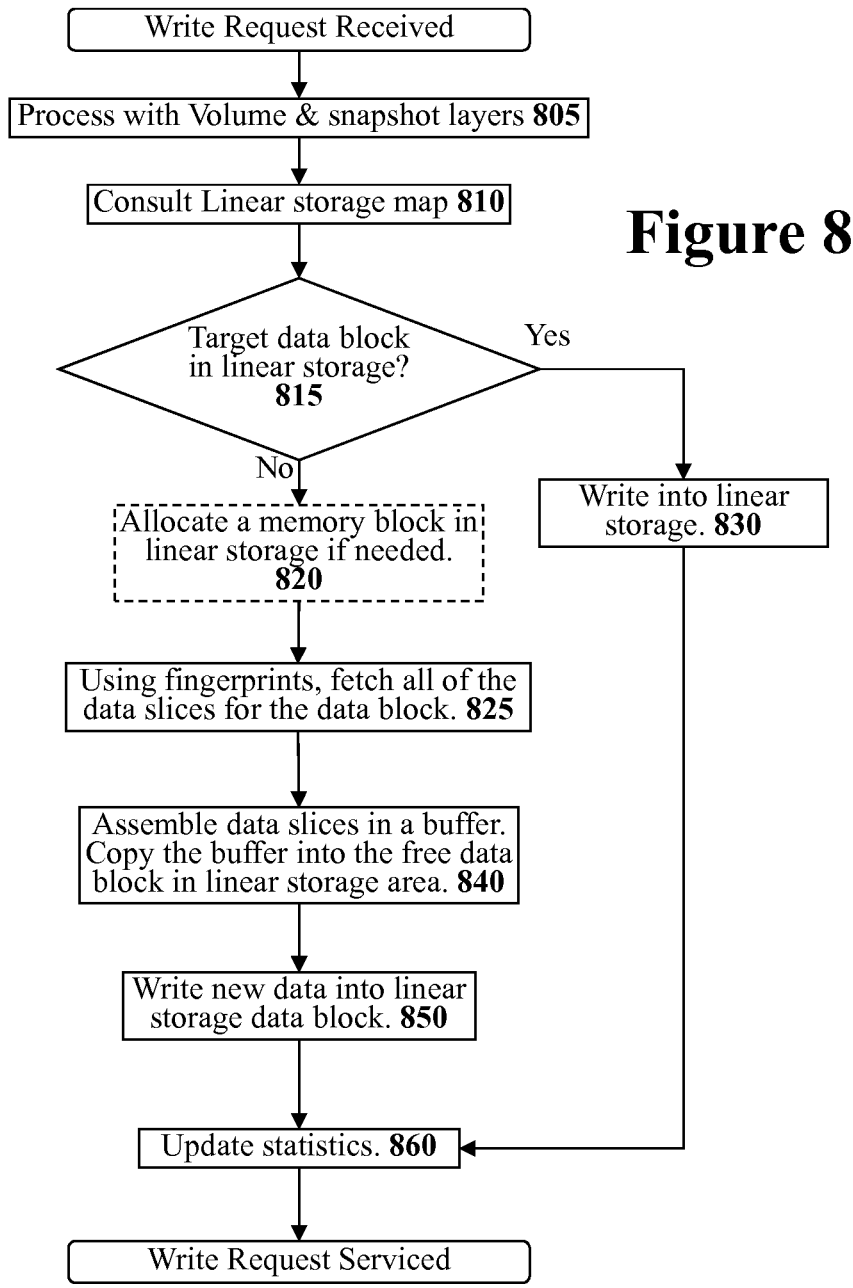
FIG. 8 illustrates a flow diagram describing how a cloud storage array may service a write request.

Referring to FIG. 8, a write request is received from a host client at the top of the flow chart. As with a read request, the write request is first processed by the SAN interface, volume abstraction, and snap shot layers at stage 805. The write request is then passed to the linear storage layer 640.

The linear storage layer 640 first examines the linear storage map 641 at stages 810 and 815 to determine how to handle to the write request. If the write is directed at a data block that is already available in the linear storage area 647 of the local data storage system 670 then handling the write request can be done easily. Specifically, the linear storage layer 640 simply writes the data into the appropriate block within the linear storage area 647 at stage 830. The system may then also update some statistics at stage 860. At this point, the write request has been fully handled.

If the data block that the write is directed at was not found to be in the linear storage area 647 at stage 715, then the linear storage layer 640 will generally first pull the data for target data block into the linear storage layer 640. The reason that data is pulled up into the linear storage layer 640 before it is overwritten is so that if a failure occurs during a write, the failure will at least leave the old data which has been partially over-written by new data. This is the way that a traditional disk based storage system operates such that applications are already prepared to handle corrupted data due to such a write failure.

To pull the data up into the linear storage area 647, the linear storage layer 640 may first need to allocate a new block of memory in the linear storage area 647 at stage 820. This may be performed by pushing data from an existing block in the linear storage area 647 down to the next lower data storage layer. Pushing data down to the next data storage layer will be described in the next section of this document about the deduplicated storage layer 650.

The linear storage layer 640 then requests all the data slices for that data block from the lower data storage layers of the storage request handling stack at stage 825. The request for the slices is made by providing the fingerprints of the needed data slices. Note that all of the slices of data for the data block are required since the entire data block will now be represented in the linear storage area 647 as a single data block. If the deduplicated storage layer 650 does not have all the needed data slices for the block in the deduplicated storage area 657, then the deduplicated storage layer 650 will request the needed data slices from the next lower layer of the storage request handling stack (the cloud storage layer 660 in this particular embodiment).

After receiving the requested data slices, the linear storage layer 640 then assembles the data slices in a buffer at stage 840. The fully assembled data block is then copied into the free memory block in linear storage area 647 such that the linear storage layer 640 is now fully responsible for that particular data block. Thus, the linear storage layer 640 updates the linear storage map 641 to reflect that the linear storage layer 640 now has that particular block of memory represented within the linear storage area 647.

It should be noted that the fetched data slices will generally be allowed to remain down in the deduplicated storage area 657. A primary reason that these data slices will continue to be in the deduplicated storage area 657 is that other areas of the data volume (or other data volumes) may refer to the fetched data slices. If a data slice is not referenced by another data block then a garbage collection mechanism will eventually discard that unreferenced data slice. However, even unreferenced data slices may be allowed to remain in the deduplicated storage area 657 for some time. The reason is that there is a benefit in keeping unused data slices for a period of time since a data block that was pulled up from the deduplicated storage layer 650 up into the linear storage layer 640 may eventually be pushed back down to the deduplicated storage layer 650. When this occurs, the pre-existing data slice in the deduplicated storage area 657 may be used again if it is still appropriate.

After the data block has been fully moved back up to the linear storage area 647, the linear storage layer 640 may then over-write the data block at stage 850. In the unlikely event of a failure during the write, the data block will contain a mix of new data overwritten onto old data. As set forth above, this is a situation that existing applications are already prepared to handle. Finally, at stage 860, the system may update some statistics. For example, a counter associated with the data block may be incremented to indicate that the data block has recently been accessed.

As set forth earlier, the cloud storage array acts roughly similar to a cache memory system where in the local storage system 670 acts as a cache memory and the data storage provider 691 acts as a main memory system. As such, the linear storage layer 640 can be configured to act as a "write-through" type of cache system or a "write-back" type of cache system.

If the system is configured as a write-through type of cache, the linear storage layer 640 may push every new write to lower layers of the storage request handling stack such that data will eventually be stored in the data storage provider 691. Note that various writes may be superseded by newer writes to the same location such that not all writes will actually propagate all the way through to the data storage provider 691. Configuring the system as a write-through cache will reduce the performance of the cloud storage array 600 but may be desirable for applications wherein reliable data storage is paramount since the data will (almost) always be propagated out the cloud based data storage provider 691 for safe keeping.

When the system is configured as a write-back type of cache (as it will be in most cases), the linear storage layer 640 will only push data blocks down to lower layers of the storage request handling stack when the linear storage layer 640 determines that a particular data location needs to be evicted from the linear storage area 647. For example, a data block may be evicted to make room for new data in the linear storage layer 640. The eviction policy may use any cache replacement strategy such as the well-known least-recently used (LRU), least-recently allocated (LRA), or least-frequently used (LFU) cache replacement policies. With a write-back cache replacement policy, the full contents of the cloud storage array 600 generally not fully propagate to the data storage provider 691. However, there is nothing wrong with this since all of the data stored within cloud storage array 600 is stored in some nonvolatile form (such as a solid state drive or a hard disk drive). Snapshots of data in the cloud storage array 600 can be backed-up locally (as will be described in a later section of this document) or proactively pushed to the cloud for disaster recovery purposes.

Memory Efficient DeDuplicated Layer

Referring back to FIG. 5, when the linear storage layer 540 determines that a particular data block is not being frequently accessed, the linear storage layer 540 sends that data block down to the deduplicated storage layer 550 for memory efficient storage in the deduplicated storage area 557. The deduplicated storage layer 550 acts as a repository for "warm" data. Warm data is defined as data that is not as frequently accessed as the "hot" data in the linear storage layer 540 but still accessed regularly, and typically read more often than written. As the name implies, the deduplicated storage layer 550 removes duplicates from the data such that data is stored much more efficiently.

In the deduplicated storage layer 550, the fingerprint (such as a SHA-256 fingerprint) of a data slice is used as an identifier for the data slice. The deduplicated storage layer 550 uses deduplicated storage map 651 to keep track of where each data slice is stored within the deduplicated storage area 557. FIG. 6 illustrates a conceptual diagram of the deduplicated storage map 651 and the deduplicated storage area 657.

As illustrated in FIG. 6, the deduplicated storage map 651 is a table that identifies the location of each data slice received from the linear storage layer 640. In practice, the deduplicated storage map 651 may be implemented as a hash table (or similar data structure) to optimize search performance. Referring back to the conceptual diagram of FIG. 6, the deduplicated storage map table 651 maps data slice fingerprints to data locations, the cloud storage, or both.

Figure 9:
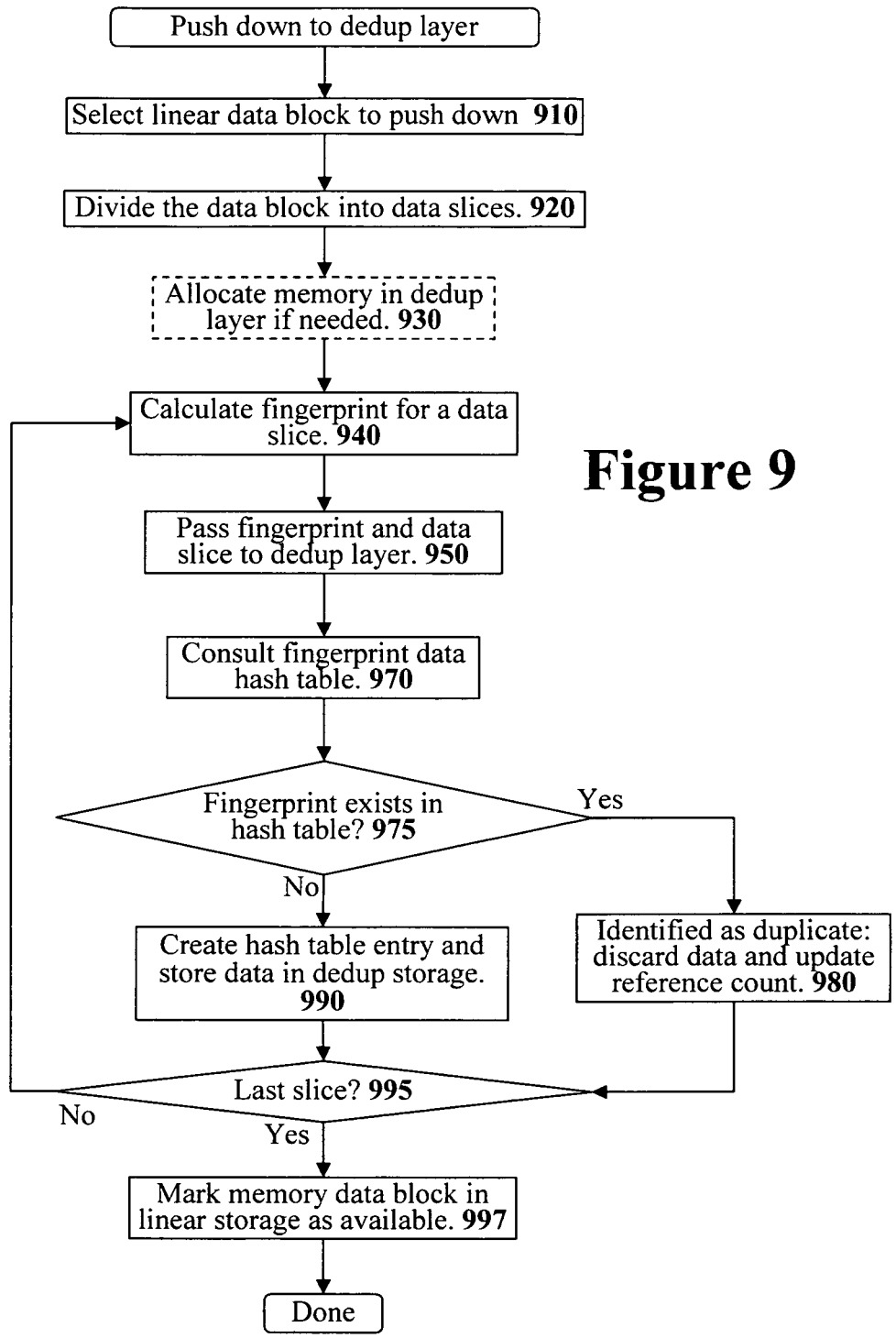
FIG. 9 illustrates a flow diagram describing how a cloud storage array may push data down to a lower data layer.

FIG. 9 illustrates a flow diagram describing how data slices are pushed down from the linear storage layer 640 to the deduplicated storage layer 650. First, at stage 910, the system must select a linear block to push down. In one embodiment, the linear storage layer 640 uses a "least recently allocated" (LRA) policy to determine when a particular data block should be pushed down to a lower data storage layer. The linear storage layer 640 may also push a data block down to the deduplicated storage layer 650 to make room for new data in the linear storage layer 640. This may be performed by a background process that attempts to keep the linear storage area 647 approximately 85% full. This allows a large amount of data to be stored but keeps the linear storage layer 640 prepared to accept a new burst of data.

After selecting a data block to push down, the linear storage layer 640 then divides the data block into a set of individual data slices at stage 920. Many different techniques may be used to slice a data block into a set of data slices. The goal is to slice the data block up into individual data slices in a manner that will result in a high probability of finding duplicated data slices.

Figure 10:
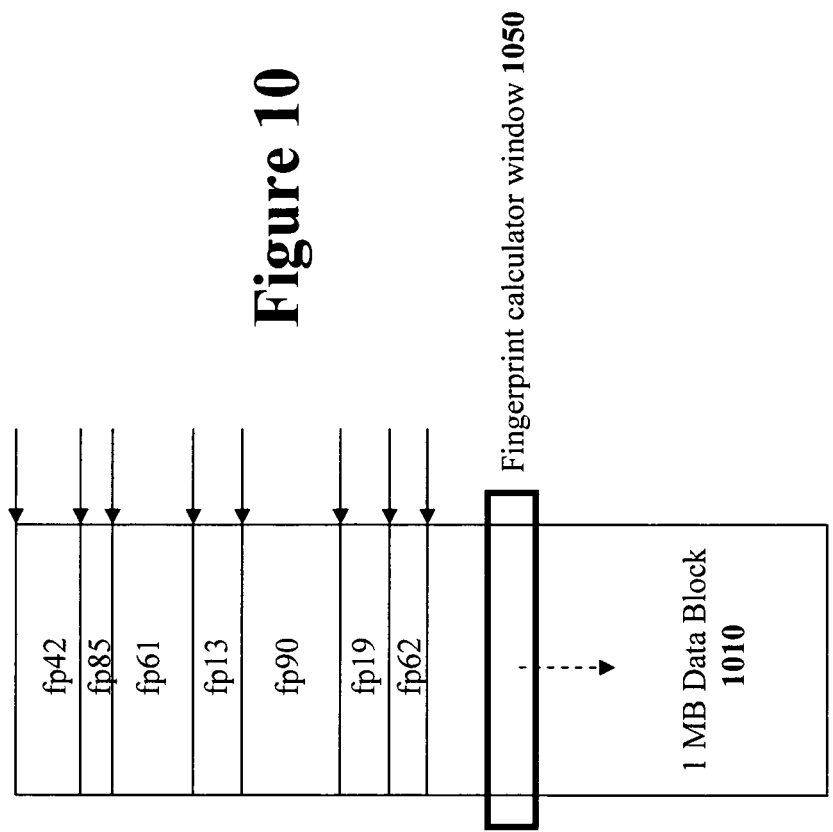
FIG. 10 conceptually illustrates a fingerprint calculator window creating fingerprints for variable sized data slices.

In one embodiment, the data block is sliced up using Rabin fingerprints. A Rabin fingerprint is a progressive polynomial that is calculated over a defined field. It is progressive since successive Rabin fingerprints may be calculated by dropping of a byte from one end of the defined field and adding another byte to the other end. This allows a Rabin fingerprint to sweep through a data block. FIG. 10 illustrates how a Rabin fingerprint calculator window 1050 may sweep through data block 1010 progressively calculating Rabin fingerprints. The Rabin fingerprint system may be used to sweep through the data block 1010 and periodically drop anchors to define data slices. An anchor may be dropped when the Rabin fingerprint equals some arbitrary value. In one embodiment, the system creates data slices that start at a first anchor defined by the beginning of the data block or the previous anchor, are at least 8K bytes long, and end when a specified Rabin fingerprint is generated or a 64K limit is reached (which ever occurs first). This will create data slices that are between 8K and 64K in length. If the arbitrary Rabin fingerprint value is selected as a value with 16 zeroes in the least significant bits of the binary Rabin fingerprint then the data slices will average out to be around 16K in size.

Referring back to FIG. 9, at stage 930 the system then may need to allocate space in the deduplicated storage area 657 if no space is available. This may be done by selecting a least recently allocated block of space in the deduplicated storage area 657 and pushing the data slices in that area down into the next lower layer (the cloud storage layer 660 in this embodiment). Note that, like the linear storage layer 640, the deduplicated storage layer 650 may also have a background process running that always attempts to keep the deduplicated storage area 657 approximately 85% filled such that it stores a large amount of data but can still always accept new data.

The linear storage layer 640 then begins to push down individual data slices. At stage 940, the linear storage layer 640 first calculates a fingerprint for a data slice. The linear storage layer 640 then provides the data slice and the fingerprint for the data slice to the deduplicated storage layer 650 at stage 950.

Next, at stage 970, the deduplicated storage layer 650 examines the fingerprint that it receives and searches the deduplicated storage map 651 for redundant data. With sufficiently strong fingerprints that have a very low probability of aliasing, simply comparing the fingerprints may be enough to identify duplicate data. In an alternative system, the deduplication may be performed in two stages. A first stage can use probabilistic methods to locate potential duplication candidates. After identifying candidates for deduplication, exhaustive algorithms verify the duplicated data and possibly adjust the data slice boundaries to obtain more duplicated data slices.

If the deduplicated storage layer 650 identifies redundant data, the deduplicated storage layer 650 may discard the data and increase a reference counter for that data at stage 980. (A reference counter may be used to keep track of how many different data blocks refer to a particular data slice.) When a received data slice is not yet represented in the deduplicated storage layer 650 (the same fingerprint was not found in the deduplicated storage map 651), then at stage 990 the deduplicated storage layer 650 stores the data slice in the deduplicated storage area 657 and creates a new entry in the deduplicated storage map 651 (which may be a hash table) that points to the newly added data slice.

At stage 995, the linear storage layer 640 determines if this was the last data slice of the data block to push down. If it is not, the linear storage layer 640 returns back to stage 940 to push down another data slice. If this was the final data slice, then the linear storage layer 640 may now update the linear storage map 641 by removing the reference to the data block and adding entries that refer to all the fingerprints of the data slices in the linear storage map 641. Thus, when a subsequent memory request is received that refers to data in the range of that particular memory block, the system will need to access the data slices now stored in the deduplicated storage area 657.

By removing duplicated data, the deduplicated storage layer 650 greatly increases the storage efficiency. This allows many more logical volumes of data to be stored in the local storage system 670 than if the data were only stored in a raw unprocessed form (as done by the linear storage layer 540). However, this increased storage efficiency comes at a cost. The linear storage layer 540 must slice up each data block and calculate fingerprints for each data slice. And the deduplicated storage layer 550 must search for duplicated data. Furthermore, pushing data into the deduplicated storage layer 550 involves significant metadata updates to maintain the deduplicated storage map 651. However, since processing power is now very inexpensive and the bandwidth of the intermediate layers is far greater than the cloud bandwidth, this is a worthy trade-off.

Another cost for the improved memory efficiency is that when a read request is received that read must be satisfied with data from the deduplicated storage area 657. Thus, the linear storage layer 640 must fetch each needed data slice from the deduplicated storage layer 650 and then reassemble the data slices to obtain the requested data. This means that the latency time for read requests that are serviced by the deduplicated storage layer 650 will be higher than the latency time for read requests that are serviced by the linear storage layer 640. However, this latency difference is relatively small and worth the trade-off since it allows more data to be stored within the local data storage 670. Storing more data in the local data storage 670 will mean fewer accesses to the cloud data storage provider 691 which will have a much greater latency time.

Referring back to FIG. 5, the deduplicated storage layer 550 acts as a local tier of data storage. The data in the deduplicated storage layer 550 is not accessed as frequently as the data in the linear storage layer 540 but data in the deduplicated storage layer 550 is still accessed on a regular basis. Although, the deduplicated storage layer 550 stores data more efficiently, the deduplicated storage layer 550 will eventually run out of storage space. When the deduplicated storage layer 550 runs out of storage space, the deduplicated storage layer 550 must begin to evict data slices. The deduplicated storage layer 550 will push the evicted data slices further down the storage request handling stack (to the cloud storage layer 560 in this embodiment). Note that cache replacement policies used by the deduplicated storage layer 550 may be the same or different than the cache replacement policies used by the linear storage layer 540.

In addition to pushing data down to the cloud storage layer 560 in order to have available space in the deduplicated storage layer 550, the deduplicated storage layer 550 may proactively push data slices out to the cloud before it is necessary. However, the data will also remain within the deduplicated storage layer 550 such that read requests may be serviced quickly. However, when data slices need to be evicted, data slices that have already been evicted can simply be removed from the deduplicated storage area 557. This allows the bandwidth of the communication link to the data storage provider 591 to be used more efficiently.

Long Term Cloud Layer and Barrier Layer

The data evicted by the deduplicated storage layer 550 need to be handled the cloud storage layer 560. And as already disclosed, data storage requests that can not fully be serviced by the above two layers need the help of the cloud storage layer 560. The cloud storage layer 560 does not store data locally (except for the temporary barrier buffer). Instead, the cloud storage layer 560 stores data out at the data storage provider 591. The cloud storage layer 560 is used to store "cold" data that is rarely accessed. Since it takes time to retrieve data from the off-site data storage provider 591, there will generally be a larger latency period for any data storage request that requires access to the off-site data storage provider 591. Ideally such latency should only occur when accessing old data archives since the vast majority of the frequently used data should be represented in the local storage system 570 of the cloud storage array 500.

When the cloud storage layer 560 receives evicted data (data slices in this particular embodiment), the cloud storage layer 560 first prepares that data to be sent to the data storage provider 591. The cloud storage layer 560 first compresses the data using compression stage 561. The compression of the data accomplishes two goals. First, the compression reduces the bandwidth requirements for the internet connection 565 to the data storage provider 591 since less data needs to be transmitted. This is very important since this reduces the large disparity between the bandwidth at the front-end storage area network connection 502 and this back-end internet connection 565 to the data storage provider 591. Second, the compression also reduces the amount of data that needs to be stored by the data storage provider 591 such that outsourced data storage costs are minimized.

Figure 11:
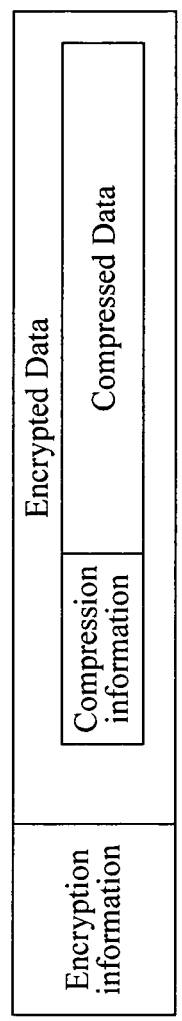
FIG. 11 illustrates a compressed data slice with prepended compression information that has been encrypted and prepended with encryption information.

Any suitable compression system may be used but in one embodiment the BZIP compression system is used. In another embodiment, the compression system allows for multiple different compression systems to be used. To do this, the compression stage 561 may prepend compression information to the compressed data as illustrated in FIG. 11. The compression information may include a code to that specifies a particular compression algorithm and version. This allows the compression stage 561 to select the proper decompression system when multiple different compression systems are used. Such a system may be able to select the optimum compression system for a particular data slice.

After compressing the data, the compressed data is then encrypted with encryption stage 562. By encrypting the data, the owner of the cloud storage array 500 does not need to fear for their data security. The encryption prevents any person tapping the interne connection 565 or examining the data at the storage provider 591 from being able to view the real meaning of the data.

Many different encryption systems may be used. In one particular embodiment, the AES-256 encryption system was implemented within the encryption stage 562. As with the compression stage, the encryption stage 562 may allow multiple different encryption systems to be used. To do this, the encryption stage 562 may prepend encryption information to the encrypted data as illustrated in FIG. 11. The encryption information allows the encryption stage 562 to select the proper decryption system and version when multiple different decryption systems are used. The prepended encryption information may also specify the size of the data since some encryption systems only operate on fixed size data and thus require padding bytes.

The use of prepended encryption information may also be used to help with key management. Encryption keys may be changed on a regular basis to improve the data security. A code may be placed into the prepended encryption information to help select the proper key for data decryption. In one embodiment, the system allows an administrator to use a passphrase to generate an encryption key. Multiple levels of authority may be used to protect keys from be lost. In addition, a built-in system may allow a customer to contact the manufacturer of the system if the passphrase has been lost.

Next, a barrier stage 563 stores a copy of the compressed and encrypted data in a barrier storage area (667 in FIG. 6) of the local storage system 570. The barrier storage area 667 is used to temporarily store a copy of data that is in the process being transmitted to the data storage provider 591. The data is kept in the barrier storage area 667 for a 'settlement period' that allows the data storage provider 591 to perform its own data storage tasks. (If data sent to the data storage provider 591 were requested too soon, the data storage provider 591 may fail at providing the data since it would not be ready to respond yet.) Thus, when the cloud storage layer 560 receives a read request for data, the cloud storage layer 560 first checks the barrier storage area of the local storage system 570 and serves the data from the barrier storage area if the data is found there.

Note that by compressing the data before the data is stored in the barrier storage area, the cloud storage layer 560 efficiently uses its allocated area of the local storage system 570. However, this comes at the expense of having to decrypt and decompress the data if a read request is received for data stored in the barrier storage area. In an alternate embodiment, the data is stored in the barrier layer before compression and decryption. In such an embodiment, there will be a lower latency period when responding from the data stored in the barrier storage area.

In addition to allowing transmitted data to settle at the data storage provider 591, the barrier stage 563 serves additional purposes. One important purpose is to handle storage request serialization. Many cloud data storage provider 591 will perform data storage requests received in close time proximity out of the order that they were received in. Thus, if a purge request is transmitted and then a write request to the same data were subsequent transmitted, the cloud data storage provider 591 might reverse the order of these requests and thus destroy data! To prevent this potential disastrous occurrence, the barrier stage 563 will place a long waiting period between data storage requests that refer to the same data.

After storing a copy in the barrier storage area, the compressed & encrypted data is then provided to a cloud transport interface stage 564 that is responsible for transmitting data to the data storage provider 591. The cloud transport interface stage 564 first creates a new data object within the cloud data storage provider 591 to store the data. In one embodiment, the system uses the same fingerprint identifier from the deduplicated storage layer 550 as the name for the data object. The cloud transport interface stage 564 then writes (transmits) the data to the newly created object. The cloud transport interface stage 564 then allows for a 'settlement period' wherein it waits a specified amount of time before the data can be read back from the data storage provider 591. This settlement period is a value that may be configured based upon the particular data storage provider 591 that is being used. Once the settlement period expires, the cloud transport interface stage 564 deletes the copy of the data that was placed in the barrier storage area 667. Thus, subsequent read operations must be serviced by requesting the data from the data storage provider 591.

To ensure that the data was properly stored with the data storage provider 591, the cloud transport interface stage 564 may calculate a checksum value of data using the same type of checksum used by the data storage provider 591. After receiving data, the data storage provider 591 may provide a checksum value back in an acknowledgement. If the two checksum values do not match, the cloud transport interface stage 564 may retransmit the data. If checksums are used, the copy of the data in the barrier section should not be removed until matching checksums have been achieved and the settlement period has expired.

Data read requests are handled by the cloud storage layer 560 in basically the same manner but in reverse order. As set forth above, the cloud storage layer 560 will first attempt to serve a data request using data stored in the barrier storage area 667. If the request cannot be served from data in the barrier storage area 667, the deduplicated storage layer 550 will then send a read request to the cloud data storage provider 591 using the fingerprint as the name of the requested data object.

After receiving a response from the cloud data storage provider 591, the cloud transport interface stage 564 can perform data integrity check on the received data by calculating a checksum on the received data. If the calculated checksum does not match the checksum received then the cloud data storage provider 591 may have corrupted the data. Retries may be attempted to obtain the proper data from the cloud data storage provider 591. If the proper data cannot be retrieved, a 'media error' message will be propagated up the data storage request handling stack.

When verified data has been received, that verified data is then provided to the encryption stage 562 for decryption. Next, the decrypted data is given to the compression stage 561 where the data is decompressed.

After requested data has been retrieved, decrypted, and decompressed, the cloud storage layer 560 passes the data back up the request handling stack. In one embodiment, the system performs a second data integrity check by recomputing the fingerprint of the decrypted/decompressed data.

The deduplicated storage layer 550 will receive the data that was fetched from the cloud and place that data back into its duplicated storage area 557 and adjust the its data structures to indicate that the data is now available in the duplicated storage area 557 of the local storage system 570. The data will remain in the duplicated storage area 557 until the deduplicated storage layer 550 again evicts the data or it is removed by the garbage collection system since it was overwritten.

Similarly, data that is read back from the cloud data storage provider 591 will continue to remain in the cloud data storage provider 591. If the deduplicated storage layer 550 again evicts data that was already once stored in the cloud data storage provider 591 and that data has not changed, then that data does not need to be retransmitted back to the cloud data storage provider 591 since it already exists there. Thus, the deduplicated storage layer 550 can just delete its copy of the data.

Transitioning to a Cloud Server Appliance

Migrating from an existing storage area network system to the disclosed cloud storage array 500 must be performed carefully in order to not lose any data. An ideal migration would allow the data center to continue functioning normally without any noticeable service interruption.

To provide a seamless migration, this document presents a method for inserting a cloud storage array into an existing data center with virtually no down time. The method operates by inserting a "migration" layer into the storage request handling stack to handle data migrations.

FIG. 12 illustrates an embodiment of a cloud storage array 1200 that includes a migration layer 1249 above the volume abstraction layer 1231. The migration layer 1249 is coupled to a legacy storage system 1209 through an interface to the storage area network 1201. The legacy storage system 1209 is then set to operate in a read-only manner. After configuring the cloud storage array 1200 for a migration from legacy storage system 1209, cloud storage array 1200 will be the primary storage system and will access the legacy storage system 1209 in a read-only manner to obtain data not yet available in the cloud storage array 1200.

Once configured for migration, the cloud storage array system 1200 can then receive data storage requests from hosts on the storage area network 1201. The SAN interface layer 1200 may process data storage requests in a normal manner. The data request is then provided to a migration layer 1249. The migration layer 1249 may call the linear storage layer 1240 to determine if the linear storage layer 1240 has the requested data or knows where the data is. When a new system is installed and configured for migration, the linear storage layer 1240 will have very little (or no) data. Thus, when the linear storage layer 1240 informs the migration layer 1249 that it does not have requested data, the migration layer 1249 will request the needed data from then the migration layer 1249 requests the needed data from the legacy storage system 1209 as any other host on the storage area network 1201 would access the legacy storage system 1209.

The migration layer 1249 will pass the requested data back to the host that requested the data. In addition, the migration layer 1249 may provide the data to the linear storage layer 1240. The linear storage layer 1240 adds the data to linear storage area of the local storage system 1270. In accordance to the cache policies, the linear storage layer 1240 will eventually evict data down to the lower storage layers starting with the deduplicated layer 1250. Similarly, the deduplicated layer 1250 will eventually evict data down to the cloud storage layer 1260 which will store data with the cloud-based data storage provider 1291. Over time, this process will move the data from the legacy storage system 1209 over to the new cloud storage array system 1200.

In addition to the passive transition system outlined above, an active transition process may also operate concurrently within the migration layer 1249. The active transition process will sweep through the existing legacy storage system 1209 and copy data into the new cloud storage array 1200. Eventually all of the data will be handled by the cloud storage array 1200. Note that during this processes, the data retrieved from the legacy storage system 1209 will enter in the linear storage layer 1240 and eventually move to the other layers. This is similar to the manner in which data that is received from client hosts enters the cloud storage array 1200 except that data is entering into the linear storage layer 1240 from the migration layer instead from the storage network interface 1220. The migration system disclosed in FIG. 12 allows for a seamless insertion of the cloud storage array into an existing data center with no data downtime beyond the insertion event itself.

Transitioning from a Cloud Server Appliance

If a particular data center wishes to transitions away from a cloud storage array 1200, a similarly elegant system can be used to perform the transition. In such a transition away from the cloud storage array 1200, the cloud storage array 1200 may be configured to operate in a read-only manner. The migration layer 1249 will process data write requests by sending the writes to the replacement storage system.

Reads will be handled in a similar fashion. Specifically, when a read request is received, the migration layer 1249 will determine if the replacement system has valid data for the read request. This may be performed by requesting the data from the replacement system to see if it provides valid data or requesting the linear storage layer 1240 if it has valid data. If the replacement system has valid data, that data will be used. If the linear storage layer 1240 has valid data, that data will be served to the requesting host and provided to the replacement storage system. That data that was just served will then be marked as invalid in the cloud storage array 1200 such that that particular data in the cloud storage array 1200 will no longer be used.

Eventually, this passive system will move data to the replacement system. In addition to the passive system, an active process may sweep though the cloud storage array system to copy over any remaining data.

The primary reason for providing a system for transitioning away is when the host workload changes to be incompatible with the cost/performance model of the cloud storage array system. A secondary reason for providing a system for transitioning away is to provide an assurance to customers that they can get their data back if the product line were to be eliminated.

Backing-Up a Cloud Server Appliance

As set forth in an earlier section and with reference to FIG. 5, the cloud storage array 500 includes a snapshot layer 532 for capturing snapshots of the current state of data volumes. The snapshot system creates a data structure with the state of a data volume frozen in time. When subsequent writes are received that would destroy the state of the data in the frozen volume, copies of the data that is about to change are made. In this manner, the data from a volume at a specific instant of time may be saved. In order to construct back-ups of data volumes in the cloud storage array, the data from the snapshot layer can be provided to direct a back-up system.

As set forth in the earlier sections, the cloud storage array 500 will store data in at least three different locations: the linear storage area, the deduplicated storage area, and the cloud storage. The data in all of these locations must be backed up for a full back-up. Since this type of storage system differs significantly from conventional storage systems wherein all the data is available locally, a different method for performing back-ups was required.

To handle the unorthodox back-up procedure, the back-up system for the cloud storage array 500 uses the Network Data Management Protocol (NDMP) system. NDMP allows an agent to decide how to back-up a particular system. The agent is allowed to define its own data organization and format for a back-up system. Thus, the back-up system for the cloud storage array uses its agent that uses its own data organization which is significantly different from conventional systems.

In the back-up system for the cloud storage array, the back-up agent consults a volume snapshot and the linear storage map to determine where all of the data is located. The data will be spread out in the snapshot storage area 537, the linear storage area 547, the deduplicated storage area 557, the barrier storage area 567, and the cloud storage service 591. The back-up agent will use the volume snapshot and the linear storage map as a guide to locate all of the data in the cloud storage array.

The back-up agent will first back up the data blocks in the snapshot storage area and the snapshot storage area 537 and the linear storage area 547. This creates a back-up of the data copied due to the copy-on-write policy in the snapshot layer and the active data in the linear storage area.

Next, the back-up agent will back-up the data slices in the deduplicated storage area 557 and the barrier storage area 567. Each of these data items is backed up with its fingerprints and any other necessary data (such as the length of the data slice). At this point, all of the data for the volume within the local storage system 570 has been backed up.

Finally, the data storage provider 591 is instructed to make a duplication of all the data slices for the volume that are currently stored with the data storage provider 591. This duplication request can be made using the mapping table information 551 retrieved from the deduplicated storage layer 550 that specifies what data is stored in the data storage provider 591. The data storage provider 591 is responsible for making an independent copy of the data slices as requested. The fingerprints for all the data slices of the volume that are currently stored with the data storage provider 591 are then written to the media device.

At this point, an entire data volume has been independently backed up. The local media device, such as a back-up tape, may now be completed and placed into storage. Part of the back-up data is stored on the media device and part of the back up resides within the data storage provider 591.

To restore the back-up, the cloud storage array is instructed to first prepare for a restoration. The cloud storage array then reads the back-up media and first restores the data that was saved from the snapshot storage area 537 and the linear storage area 547. This data will initially be placed into the linear storage area 547. However, the data will be pushed down the data storage layers as needed. Next, the cloud storage array reads all the data slices that were stored on the back-up media. These data slices will be stored into the deduplicated storage layer 550. However, the data slices will be pushed down the storage handling stack as needed. Finally, the back-up agent will request the data storage provider 591 to restore the data slices that earlier asked to back up. At this point, the volume has been complete restored and may be exposed to hosts.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim is still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

We claim:

1. A data storage system, comprising:
    a processor;
    a first memory configured as a first storage layer for storing blocks of data;
    a second memory configured as a second storage layer for storing segments of data;
    a third memory coupled to one or more processors, the memory having program instructions stored thereon that, upon execution by the processors, cause the data storage system to:
        receive a storage request from an external system, the storage request including new data to be stored;
        select an existing data block from the first storage layer for removal to the second storage layer;
        slice the selected existing data block into segments, wherein each segment is uniquely identified by a fingerprint;
        identify any segments that are duplicates of segments already stored in the second storage layer, wherein duplicates are identified based on the segment fingerprints;
        transfer any non-duplicate segments from the first storage layer to the second storage layer, wherein each transfer of a segment to the second storage layer is mapped in a first storage map by the fingerprint of the segment;
        store the new data in the first storage layer, wherein the storage of the new data in the first storage layer is mapped in the first storage map;
        select one or more segments from the second storage layer for removal to a third storage layer, wherein the third storage layer is hosted by a bulk storage system; and
        transfer the selected segments from the second storage layer to the third storage layer,
            wherein each transfer of a selected segment to the third storage layer is mapped in the first storage map by the fingerprint of the selected segment.

2. The data storage system of claim 1, wherein the external system is a Storage Area Network.

3. The data storage system of claim 1, further comprising:
    a fourth memory configured storing data snapshots; and
    wherein the second memory having further program instructions that, upon execution by the processor, cause the data storage system to
        store a snapshot of the new data in the snapshot data storage.

4. The data storage system of claim 1, wherein the first storage map is configured to track each segment transferred to the second storage layer according to its fingerprint.

5. The data storage system of claim 4, wherein the first storage map is further configured to track each segment transferred to the third storage layer according to its fingerprint.

6. The data storage system of claim 5, wherein the mapping of segment transfers to the second storage layer is further maintained in a second storage map, the second storage map configured to track the location each segment is stored in the second storage layer.

7. The data storage system of claim 6, wherein the tracking of the storage location of the segments stored in the second storage layer is according the fingerprint of the segments.

8. The data storage system of claim 1, wherein segment fingerprints are statistically unique values calculated for each slice of the data.

9. The data storage system of claim 4, wherein the second memory having further program instructions that, upon execution by the processor, cause the data storage system to:
    track the storage location of the new data stored in the first storage layer in the first data map.

10. The data storage system of claim 6, wherein the bulk storage system used by the third storage layer is cloud storage and wherein the transfer of segments to the third storage layer is maintained in the second storage map, the second storage map configured to track the location each transferred segment is stored in the cloud storage.

11. A method for storing data in a three-tiered data storage system including a first storage layer configured for storing blocks of data, a second storage layer configured for storing segments of data and a third storage layer configured for bulk storage of segments of data, the method comprising:
    receiving a storage request from an external system, the storage request including new data to be stored;
    selecting an existing data block from the first storage layer for removal to the second storage layer;
    slicing the selected existing data block into segments, wherein each segment is uniquely identified by a fingerprint;

identifying any segments that are duplicates of segments already stored in the second storage layer, wherein duplicates are identified based on the segment fingerprints;

transferring any non-duplicate segments from the first storage layer to the second storage layer, wherein each transfer of a segment to the second storage layer is mapped in a first storage map by the fingerprint of the segment;

storing the new data in the first storage layer, wherein the storage of the new data in the first storage layer is mapped in the first storage map;

selecting one or more segments from the second storage layer for removal to a third storage layer, wherein the third storage layer is hosted by a bulk storage system; and transferring the selected segments from the second storage layer to the third storage layer,
wherein each transfer of a selected segment to the third storage layer is mapped in the first storage map by the fingerprint of the selected segment.

12. The data storage method of claim 11, wherein the external system is a Storage Area Network.

13. The data storage method of claim 11, further comprising:
storing a snapshot of the new data in a snapshot data storage.

14. The data storage method of claim 11, wherein the first storage map is configured to track each segment transferred to the second storage layer according to its fingerprint.

15. The data storage method of claim 14, wherein the first storage map is further configured to track each segment transferred to the third storage layer according to its fingerprint.

16. The data storage method of claim 15, wherein the mapping of segment transfers to the second storage layer is further maintained in a second storage map, the second storage map configured to track the location each segment is stored in the second storage layer.

17. The data storage method of claim 16, wherein the tracking of the storage location of the segments stored in the second storage layer is according the fingerprint of the segments.

18. The data storage method of claim 11, wherein segment fingerprints are statistically unique values calculated for each slice of the data.

19. The data storage method of claim 14, the method further comprising:
tracking the storage location of the new data stored in the first storage layer in the first data map.

20. The data storage method of claim 16, wherein the bulk storage system used by the third storage layer is cloud storage and wherein the transfer of segments to the third storage layer is maintained in the second storage map, the second storage map configured to track the location each transferred segment is stored in the cloud storage.

* * * * *